US008467886B2

(12) United States Patent
Kondo

(10) Patent No.: US 8,467,886 B2
(45) Date of Patent: Jun. 18, 2013

(54) MOBILE OBJECT APPARATUS, MOBILE OBJECT SYSTEM, IMAGING DEVICE AND METHOD, AND ALERTING DEVICE AND METHOD

(75) Inventor: Tetsujiro Kondo, Tokyo (JP)

(73) Assignee: Sony Corporation, Shinagawa-Ku (JP)

( * ) Notice: Subject to any disclaimer, the term of this patent is extended or adjusted under 35 U.S.C. 154(b) by 756 days.

(21) Appl. No.: 11/420,593

(22) Filed: May 26, 2006

(65) Prior Publication Data
US 2007/0185587 A1    Aug. 9, 2007

(30) Foreign Application Priority Data
Jun. 3, 2005  (JP) .............................. JP2005-164011

(51) Int. Cl.
*G05B 11/01* (2006.01)

(52) U.S. Cl.
USPC ................. 700/19; 700/245; 700/255; 901/6; 211/95

(58) Field of Classification Search
USPC .. 700/245; 211/1.52, 26, 95; 382/106; 901/1, 901/4, 6; 701/38
See application file for complete search history.

(56) References Cited

U.S. PATENT DOCUMENTS

| | | | | |
|---|---|---|---|---|
| 3,872,945 A | * | 3/1975 | Hickman et al. | 180/65.6 |
| 5,437,495 A | * | 8/1995 | Wu | 297/241 |
| 6,471,420 B1 | * | 10/2002 | Maekawa et al. | 704/250 |
| 6,983,813 B1 | * | 1/2006 | Wright | 180/11 |
| 7,123,285 B2 | * | 10/2006 | Smith et al. | 348/14.05 |
| 7,443,115 B2 | * | 10/2008 | Okamoto et al. | 318/100 |
| 2005/0096790 A1 | * | 5/2005 | Tamura et al. | 700/245 |
| 2005/0104548 A1 | * | 5/2005 | Takenaka et al. | 318/568.12 |
| 2005/0157908 A1 | * | 7/2005 | Matsugu et al. | 382/107 |
| 2007/0086880 A1 | * | 4/2007 | Jordan | 414/630 |
| 2007/0252919 A1 | * | 11/2007 | McGreevy | 348/825 |

FOREIGN PATENT DOCUMENTS

| | | |
|---|---|---|
| JP | 2003-281660 | 10/2003 |
| JP | 2004-017791 | 1/2004 |
| JP | 2004-297675 | 10/2004 |
| JP | 2005-103678 | 4/2005 |

OTHER PUBLICATIONS

Japanese Office Action issued on Feb. 15, 2011, for corresponding Japanese Appln. No. 2005-164011.

* cited by examiner

*Primary Examiner* — Mohammad Ali
*Assistant Examiner* — Sheela S Rao
(74) *Attorney, Agent, or Firm* — K&L Gates LLP

(57) ABSTRACT

A mobile object apparatus is provided. The mobile object apparatus includes an object having a first function; a moving unit that is capable of moving so as to move the object; a driving unit configured to drive the moving unit; and a receiver configured to receive a command from outside. The driving unit controls the moving unit according to the command received so that a second function is achieved.

15 Claims, 21 Drawing Sheets

FIG. 3
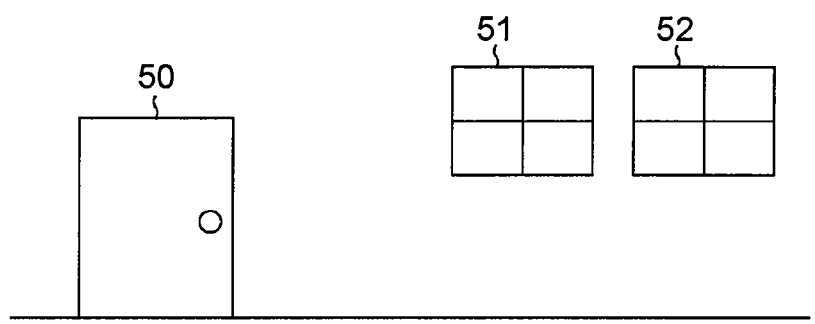
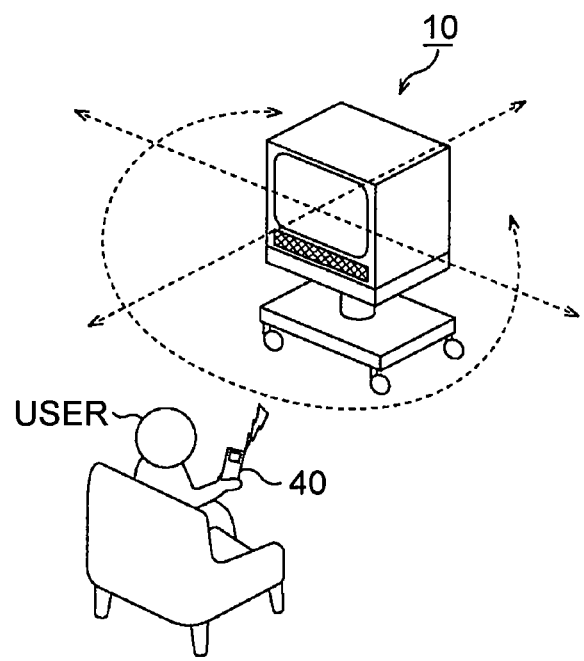

FIG. 6

| SPECIFIC WORD | PROCESSING INFORMATION |
|---|---|
| THIEF, A TOWN | ANTI-CRIME MEASURES |
| FLOOD, B TOWN | ANTI-FLOOD MEASURES |
| ⋮ | ⋮ |

| PRIORITY | SUBJECT INFORMATION | COORDINATES | HEIGHT INFORMATION |
|---|---|---|---|
| HIGH ↕ LOW | DOOR 50 | (10, 100) | 30 |
| | WINDOW 51 | (80, 100) | 100 |
| | WINDOW 52 | (90, 100) | 100 |
| | ⋮ | ⋮ | |

FIG. 10
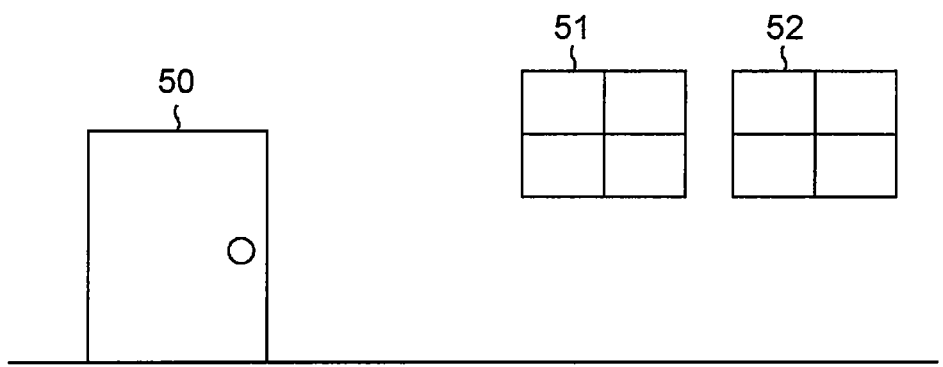
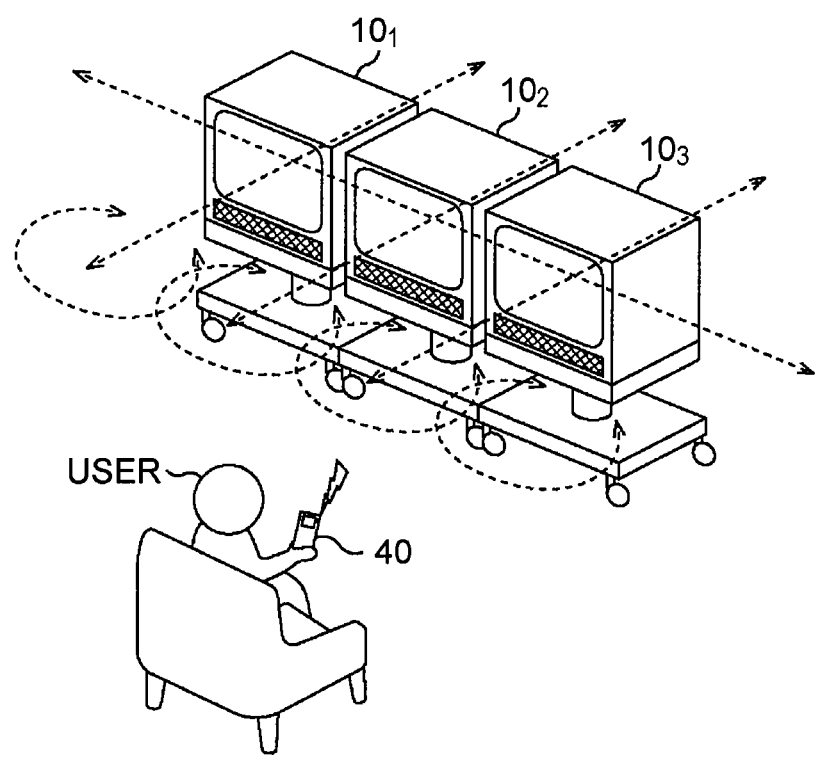

FIG. 11
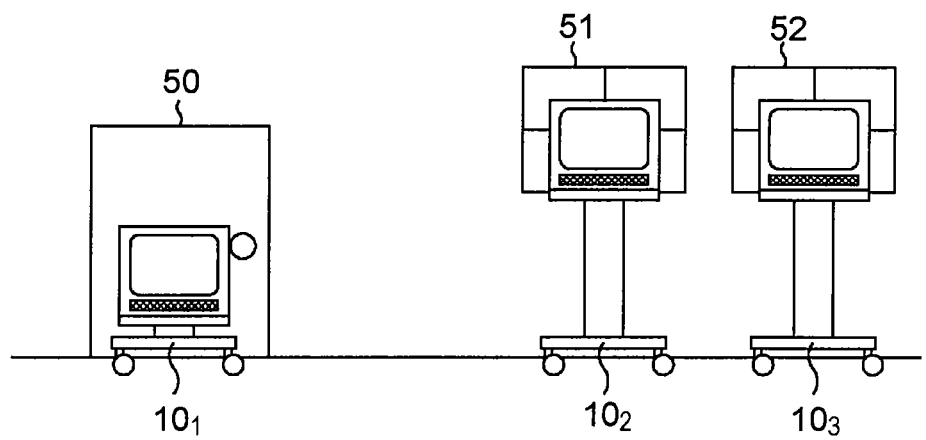
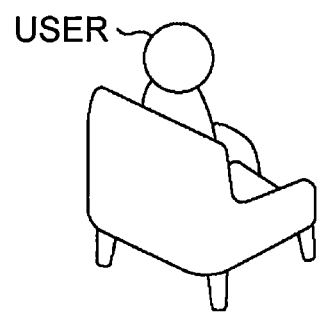

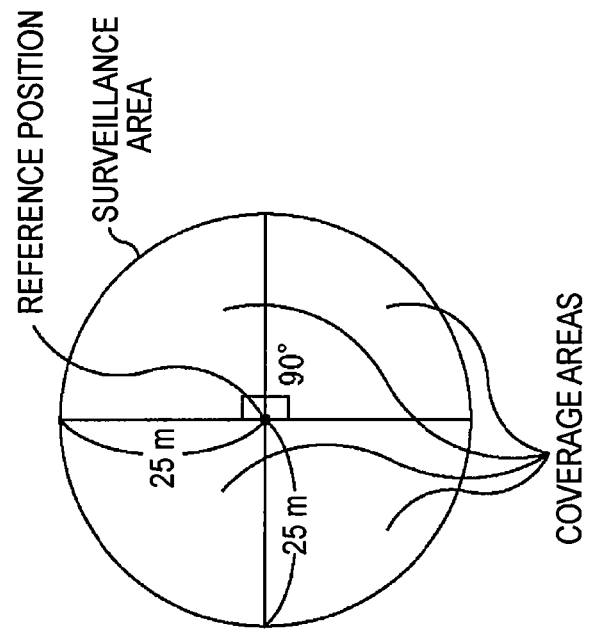

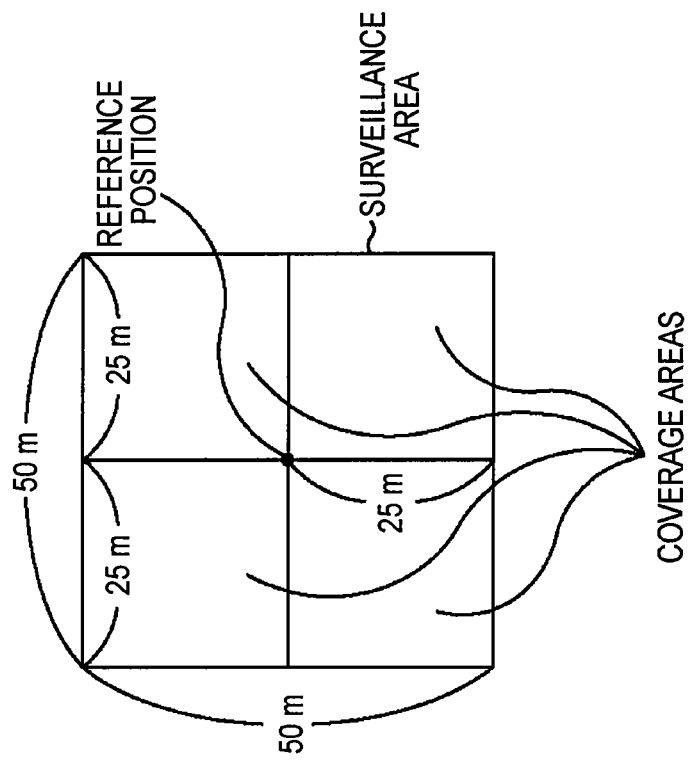

| NUMBER OF ROBOTS | RANGE INFORMATION |
|---|---|
| 1 | 10 m |
| 2 | 20 m |
| 3 | 30 m |
| ... | ... |

MOBILE OBJECT APPARATUS, MOBILE OBJECT SYSTEM, IMAGING DEVICE AND METHOD, AND ALERTING DEVICE AND METHOD

CROSS REFERENCES TO RELATED APPLICATIONS

The present application claims priority to Japanese Patent Application JP 2005-164011 filed in the Japanese Patent Office on Jun. 3, 2005, the entire contents of which are incorporated herein by reference.

BACKGROUND

The present application relates to mobile object apparatuses and mobile object systems, imaging devices and methods, and alerting devices and methods. More specifically, for example, the present application relates to a mobile object apparatus and a mobile object system, an imaging device and method, and an alerting device and method with which new types of robots can be constructed.

For example, Japanese Unexamined Patent Application Publication No. 2004-297675 discloses a robot that functions as a mobile imaging device. The robot adjusts an angle of an image captured by an imager and moves the imager so that an object can be imaged appropriately.

As another example, Japanese Unexamined Patent Application Publication No. 2004-017791 discloses a robot that is capable of making turns efficiently, that is capable of getting over obstacles with steps of certain heights, and that has an improved precision of movement control.

SUMMARY

Although various types of robots have been proposed, there exists a demand for development of new types of robots.

According to an embodiment of the present invention, there is provided a mobile object apparatus or a mobile object system including an object having a first function; a moving unit that is capable of moving so as to move the object; a driving unit configured to drive the moving unit; and a receiver configured to receive a command from outside; wherein the driving unit controls the moving unit according to the command received so that a second function is achieved.

According to the mobile object apparatus or the mobile object system, the driving unit controls the moving unit according to a command received by the receiver so that the object having the first function is moved and so that the second function is achieved.

According to another embodiment, there is provided a mobile imaging device or an imaging method including range-of-movement determining means for or step of determining a range of movement in which the imaging device is allowed to move; detecting means for or step of detecting a desired target of detection in the range of movement; moving means for or step of moving the imaging device so that the imaging device is located at a desired position relative to the target of detection detected; imaging means for or step of imaging the target of detection from the desired position and outputting imaged information of the target of detection; and outputting means for or step of outputting the imaged information to outside; wherein output of the imaged information to outside and movement of the imaging device by the moving means are stopped when the imaging device is moved out of the range of movement.

According to the mobile imaging device or the imaging method, a range of movement in which the mobile imaging device is allowed to move is determined, and a desired target of detection is detected in the range of movement. Furthermore, the mobile imaging device is moved so that the mobile imaging device is located at a desired position relative to the target of detection detected, the target of detection is imaged from the desired position, and imaged information of the target of detection is output to outside. Then, output of the imaged information to outside and movement of the mobile imaging device are stopped when the mobile imaging device is moved out of the range of movement.

According to another embodiment, there is provided a mobile alerting device or an alerting method including range-of-movement determining means for or step of determining a range of movement in which the alerting device is allowed to move; detecting means for or step of detecting a desired target of detection in the range of movement; moving means for or step of moving the alerting device so that the alerting device is located at a desired position relative to the target of detection detected; and alerting means for or step of issuing an alert to the target of detection from the desired position; wherein the alert and movement of the alerting device are stopped when the alerting device is moved out of the range of movement.

According to the mobile alerting device or the alerting method, a range of movement in which the mobile alerting device is allowed to move is determined, and a desired target of detection is detected in the range of movement. Furthermore, the mobile alerting device is moved so that the mobile alerting device is located at a desired position relative to the target of detection detected, and an alert is issued to the target of detection from the desired position. Then, the alert and movement of the alerting device are stopped when the mobile alerting device is moved out of the range of movement.

According to these embodiments of the present invention, new types of robots can be provided.

Additional features and advantages are described herein, and will be apparent from, the following Detailed Description and the figures.

BRIEF DESCRIPTION OF THE FIGURES

FIG. 3 is a perspective view for explaining a status of usage of the mobility-equipped TV;

FIG. 6 is a diagram showing a first table;

FIG. 10 is a perspective view for explaining a status of usage of a mobility-equipped TV system;

FIG. 11 is a perspective view for explaining a status of usage of the mobility-equipped TV system;

FIGS. 16A and 16B are diagrams for explaining a first example of a ROM table;

FIGS. 17A and 17B are diagrams for explaining a second example of a ROM table;

DETAILED DESCRIPTION

Figure 1:
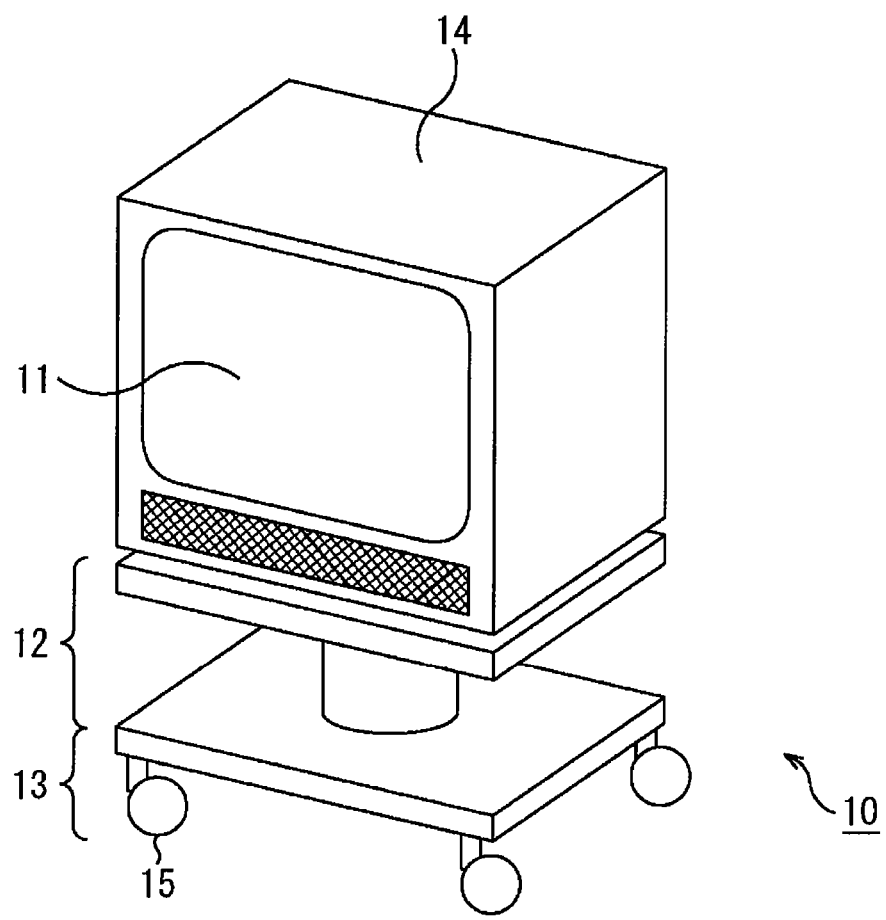
FIG. 1 is a perspective view showing an example configuration of a mobility-equipped TV according to an embodiment.

Now, embodiments will be described with reference to the drawings.

A mobile object apparatus according to an embodiment includes an object (e.g., a TV unit 14 shown in FIG. 1) having a first function; a moving unit (e.g., a moving unit 13 shown in FIG. 5) that is capable of moving so as to move the object; a driving unit (e.g., a movement controller 22 shown in FIG. 5) configured to drive the moving unit; and a receiver (e.g., a receiver 26 shown in FIG. 5) configured to receive a command from outside; and the driving unit controls the moving unit according to the command received so that a second function is achieved.

The mobile object apparatus may further include a second receiver (e.g., a tuner 32 shown in FIG. 5) configured to receive a video signal or audio signal from outside. In this case, the driving unit controls the moving unit on the basis of information extracted from the video signal or audio signal received by the second receiver.

A mobile object system according to an embodiment includes a plurality of mobile object apparatuses (e.g., mobility-equipped TVs 101, 102, and 103 shown in FIGS. 10 and 11), each of the plurality of mobile object apparatuses including an object (e.g., the TV unit 14 shown in FIG. 1) having a first function; a moving unit (e.g., the moving unit 13 shown in FIG. 5) that is capable of moving so as to move the object; a driving unit (e.g., the movement controller 22 shown in FIG. 5) configured to drive the moving unit; and a receiver (e.g., the receiver 26 shown in FIG. 5) configured to receive a command from outside; and the driving unit controls the moving unit according to the command received so that a second function is achieved.

In the mobile object system, each of the plurality of mobile object apparatuses may further include a second receiver (e.g., the tuner 32 shown in FIG. 5) configured to receive a video signal or audio signal from outside. In this case, the driving unit controls the moving unit on the basis of information extracted from the video signal or audio signal received by the second receiver.

A mobile imaging device (e.g., a robot camera 100 shown in FIG. 12) according to an embodiment includes range-of-movement determining means (e.g., an amount-of-control calculator 108 shown in FIG. 14, which executes step S106 shown in FIG. 19) for determining a range of movement in which the imaging device is allowed to move; detecting means (e.g., an image checker 107 shown in FIG. 14, which executes step S1122 shown in FIG. 21) for detecting a desired target of detection in the range of movement; moving means (e.g., a movement controller 110 shown in FIG. 14, which executes step S123 shown in FIG. 21) for moving the imaging device so that the imaging device is located at a desired position relative to the target of detection detected by the detecting means; imaging means (an imager 101 shown in FIG. 14, which executes step S123 shown in FIG. 21) for imaging the target of detection from the desired position and outputting imaged information of the target of detection; and outputting means (e.g., a transmitter 111 shown in FIG. 14, which executes step S123 shown in FIG. 21) for outputting the imaged information to outside, and output of the imaged information to outside and movement of the imaging device by the moving means are stopped when the imaging device is moved out of the range of movement.

Figure 14:
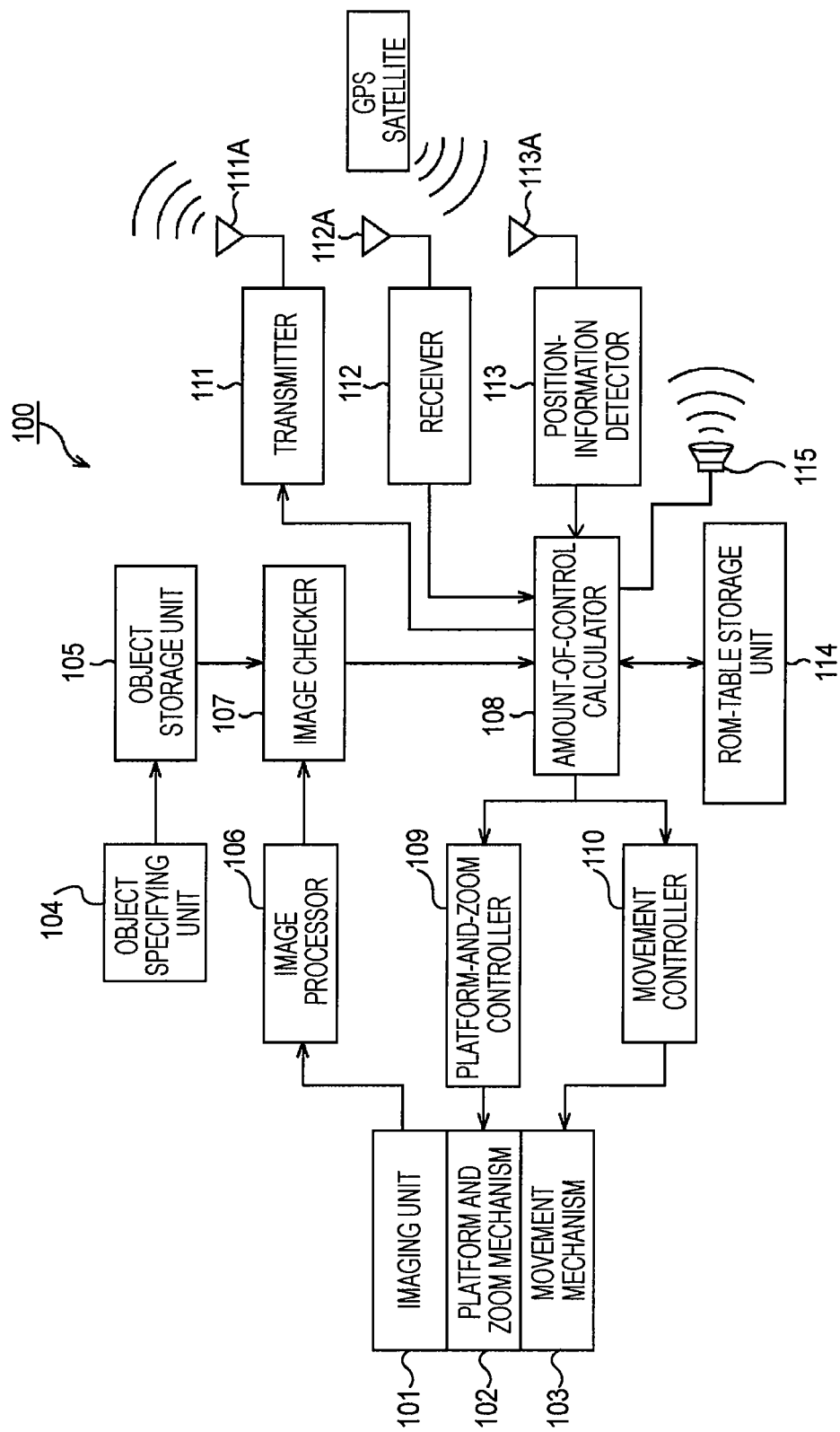
FIG. 14 is a block diagram showing an example functional configuration of the robot camera.

The mobile imaging device may further include communicating means (e.g., the transmitter 111, a receiver 112, and a position-information detector 113 shown in FIG. 14) for communicating with one or more other mobile imaging devices and with satellites of the Global Positioning System. In this case, the range-of-movement determining means determines the range of movement on the basis of information of the one or more other imaging devices, obtained from the communicating means, and position information of the mobile imaging device, obtained from the communicating means.

Also, the mobile imaging device may further include a speaker (e.g., a speaker 115 shown in FIG. 14) configured to output an alarm. In this case, the speaker outputs the alarm when the target of detection is being imaged by the imaging means.

An imaging method according to an embodiment is an imaging method of detecting a target of detection and imaging the target of detection by an imaging device (e.g., the imager 101 shown in FIG. 14), the imaging method including the steps of determining a range of movement in which the imaging device is allowed to move (e.g., step S106 shown in FIG. 19); detecting a desired target of detection in the range of movement (e.g., step S122 shown in FIG. 21); moving the imaging device so that the imaging device is located at a desired position relative to the target of detection detected (e.g., step S123 shown in FIG. 21); imaging the target of detection from the desired position and outputting imaged information of the target of detection (e.g., step S123 shown in FIG. 21); and outputting the imaged information to outside (e.g., step S123 shown in FIG. 21); wherein output of the imaged information to outside and movement of the imaging device are stopped when the imaging device is moved out of the range of movement.

A mobile alerting device (e.g., the robot camera 100 shown in FIG. 12) according to an embodiment of the present invention includes range-of-movement determining means (e.g., the amount-of-control calculator 108 shown in FIG. 14, which executes step S106 shown in FIG. 19) for determining a range of movement in which the alerting device is allowed to move; detecting means (e.g., the image checker 107 shown in FIG. 14, which executes step S122 shown in FIG. 21) for detecting a desired target of detection in the range of movement; moving means (e.g., the movement controller 110 shown in FIG. 14, which executes step S123 shown in FIG. 21) for moving the alerting device so that the alerting device is located at a desired position relative to the target of detection detected by the detecting means; and alerting means (e.g., the speaker 115 shown in FIG. 14, which executes step S123 shown in FIG. 21) for issuing an alert to the target of detection from the desired position, and the alert and movement of the alerting device are stopped when the alerting device is moved out of the range of movement.

The mobile alerting device may further include communicating means (e.g., the transmitter 111, the receiver 112, and the position-information detector 113 shown in FIG. 14) for communicating with one or more other mobile alerting devices and with satellites of the Global Positioning System. In this case, the range-of-movement determining means determines the range of movement on the basis of information of the one or more other alerting devices, obtained from the communicating means, and position information of the mobile alerting device, obtained from the communicating means.

An alerting method according to an embodiment is an alerting method of detecting a target of detection and issuing an alert to the target of detection by an alerting device (e.g., the robot camera 100 shown in FIG. 12), the alerting method including the steps of determining a range of movement in which the alerting device is allowed to move (e.g., step S106 shown in FIG. 19); detecting a desired target of detection in the range of movement (e.g., step S122 shown in FIG. 21); moving the alerting device so that the alerting device is located at a desired position relative to the target of detection detected (e.g., step S123 shown in FIG. 21); and issuing an alert to the target of detection from the desired position (e.g., step S123 shown in FIG. 21); wherein the alert and movement of the alerting device are stopped when the alerting device is moved out of the range of movement.

Figure 2:
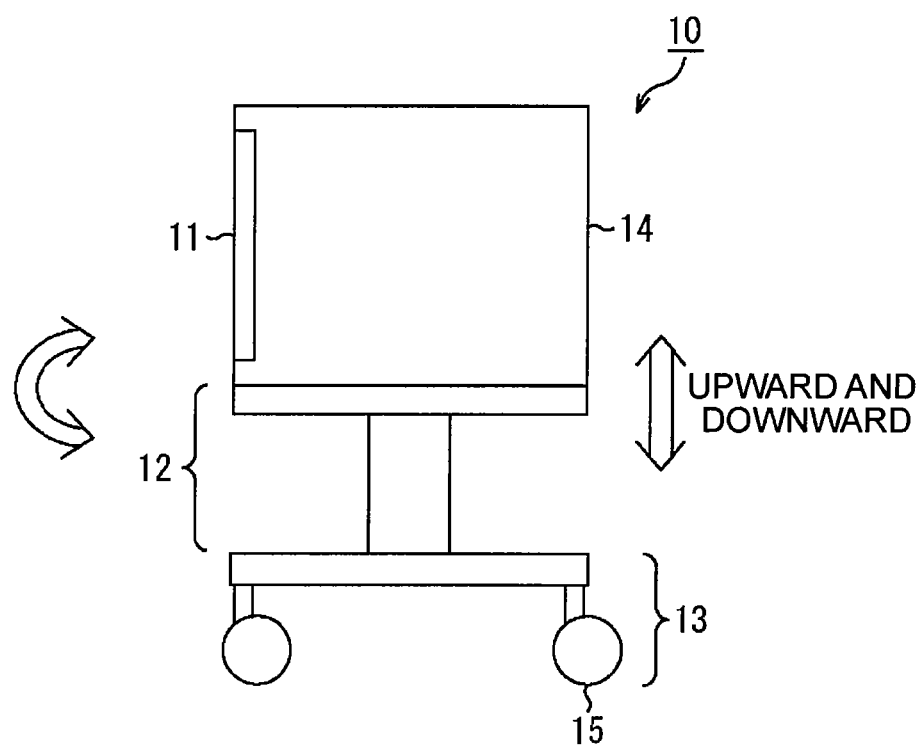
FIG. 2 is right side view showing the example configuration of the mobility-equipped TV.

FIG. 1 is a perspective view of a mobility-equipped television receiver 10 according to an embodiment of the present invention. FIG. 2 is a right side view of the mobility-equipped television receiver 10.

The mobility-equipped television receiver 10 is a type of mobility-equipped actuator, which is a new kind of robot. A mobility-equipped actuator refers to an "actuator" that changes its position (the position on a plane perpendicular to the direction of gravity) in accordance with certain input from outside, and an "actuator" herein refers to an object that is capable of producing certain output. Thus, an "actuator" herein may refer to a motor that is capable of applying power to the outside, and may also refer to, for example, a display that is capable of outputting (presenting) video (image) or a speaker that is capable of outputting sound.

Hereinafter, a television receiver will be abbreviated as a TV as appropriate.

As shown in FIGS. 1 and 2, the mobility-equipped TV 10 includes a TV unit 14, a platform 12, and a moving unit 13.

The TV unit 14 is a TV having a display 11 on a front side thereof. The TV unit 14 has a function of displaying video and outputting sound.

The platform 12 is a mechanism that is capable of extending and folding upward and downward and that is also capable of rotating about an axis extending in the vertical direction. The TV unit 14 is mounted and fixed on the platform 12. Thus, when the platform 12 rotates or moves upward or downward, the TV unit 14 also rotates or moves upward or downward accordingly.

The moving unit 13 has a plurality of rotators 15 on a bottom side thereof. The moving unit 13 can move in directions such as forward, backward, leftward, or rightward as the rotators 15 rotates in contact with a surface such as a floor or the ground. On a top side of the moving unit 13, the platform 12 is fixed. Thus, the entire mobility-equipped TV 10 moves when the moving unit 13 moves.

Next, the status of usage of the mobility-equipped TV 10 will be described with reference to FIGS. 3 and 4.

Figure 4:
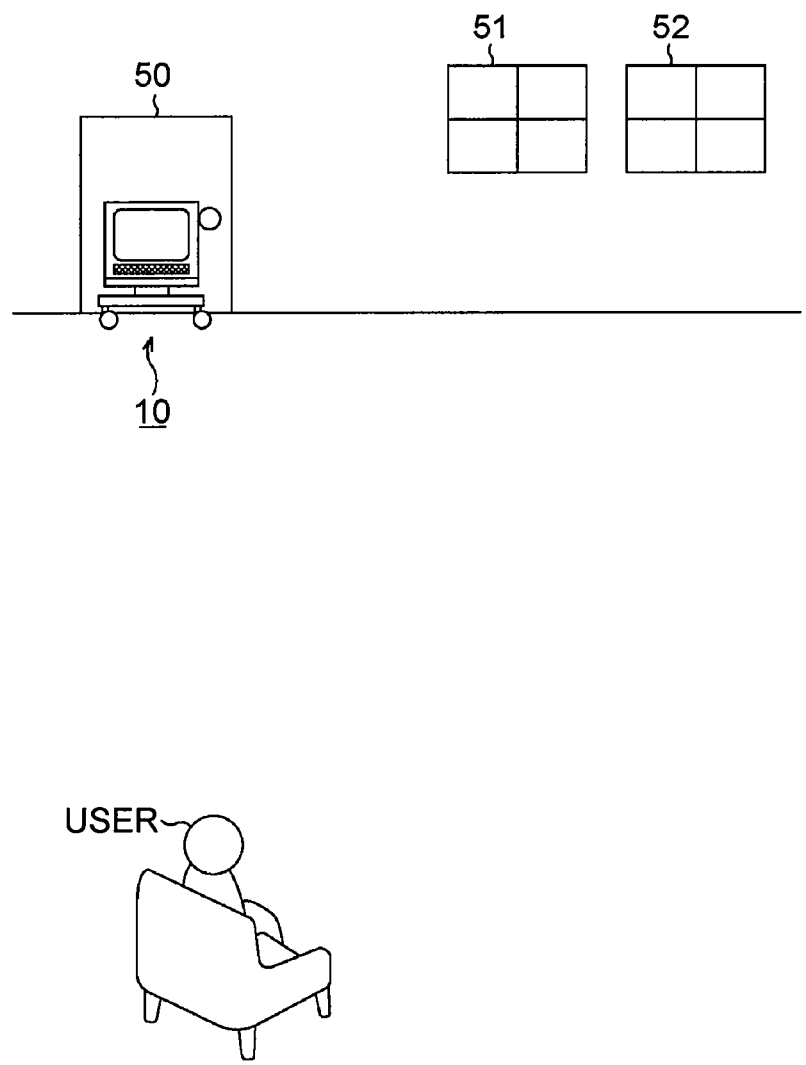
FIG. 4 is a perspective view for explaining a status of usage of the mobility-equipped TV.

FIGS. 3 and 4 are perspective views showing the status of a room (house) where the mobility-equipped TV 10 is located.

A user can move the mobility-equipped TV 10, for example, by operating a remote commander 40 to send a command to the mobility-equipped TV 10.

More specifically, when the user operates the remote commander 40 to send a command from the remote commander 40 to the mobility-equipped TV 10, the mobility-equipped TV 10 receives the command transmitted from the remote commander 40. In the mobility-equipped TV 10, the platform 12 and the moving unit 13 are driven according to the command from the remote commander 40.

Thus, as shown in FIG. 3, the mobility-equipped TV 10 changes its position or changes the direction or height of the display 11 according to the user's operation of the remote commander 40.

Thus, the user can change the position of the mobility-equipped TV 10 or change the direction or height of the display 11 simply by operating the remote commander 40.

As well as moving according to commands from the remote commander 40 as described above, the mobility-equipped TV 10 also moves according to other inputs from outside. For example, according to inputs from the outside other than commands from the remote commander 40, among a door 50, a window 51, and a window 52, the mobility-equipped TV 10 moves to the position of the door 50, thereby restricting entry to the room via the door 50, as shown in FIG. 4.

Figure 5:
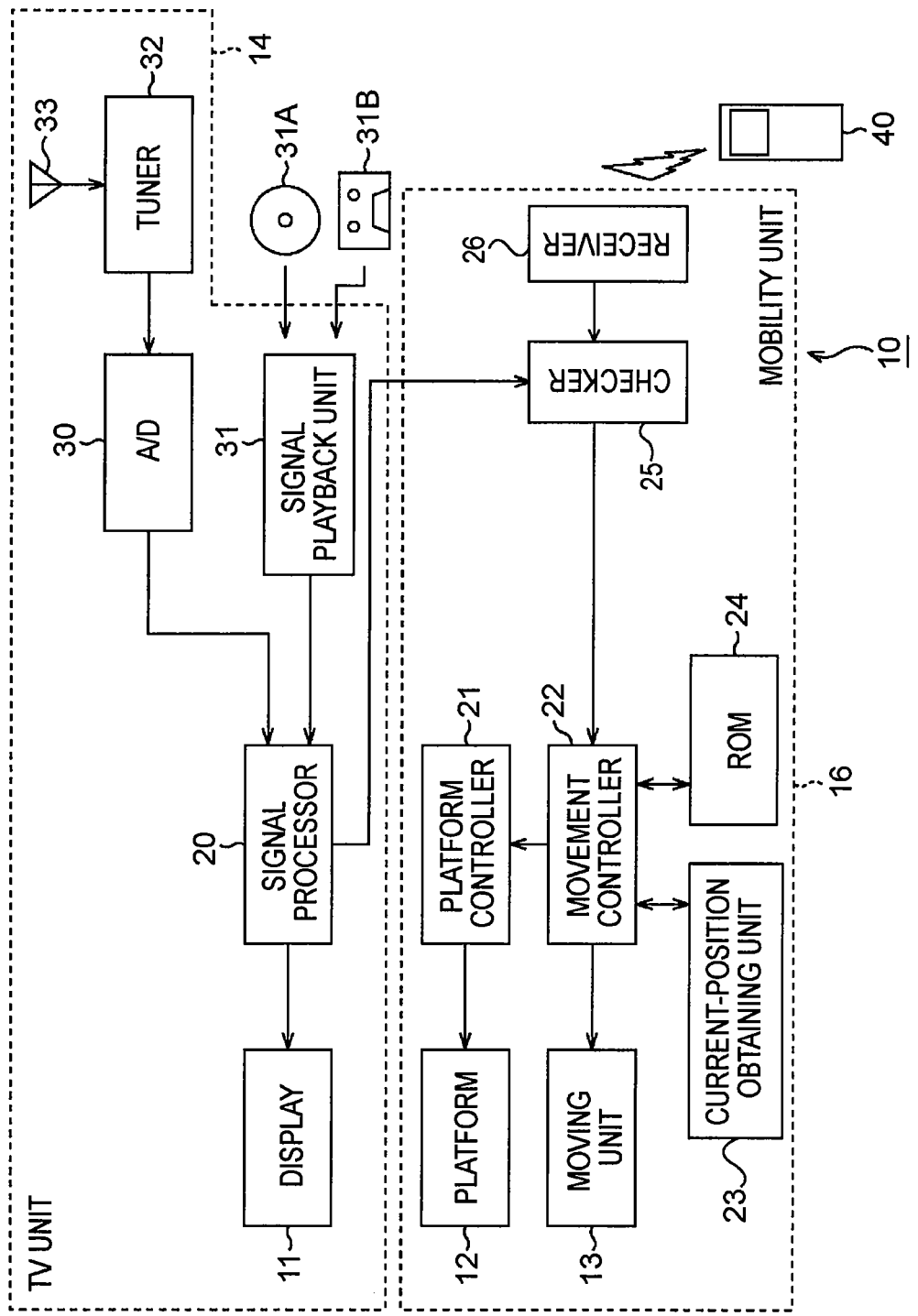
FIG. 5 is a block diagram showing an example functional configuration of the mobility-equipped TV.

FIG. 5 shows an example functional configuration of the mobility-equipped TV 10 described with reference to FIGS. 1 to 4.

As shown in FIG. 5, the mobility-equipped TV 10 includes the TV unit 14 and a mobility unit 16.

The TV unit 14 includes the display 11, a signal processor 20, an A/D (analog/digital) converter 30, a signal playback unit 31, and a tuner 32.

The mobility unit 16 includes the platform 12, the moving unit 13, a platform controller 21, a movement controller 22, a current-position obtaining unit 23, a read-only memory (ROM) 24, a checker 25, and a receiver 26.

In the mobility-equipped TV 10, the tuner 32 receives broadcast signals supplied from an antenna 32, and the broadcast signals are demodulated into video or audio signals. The video or audio signals obtained by the tuner 32 are converted from analog to digital via the A/D converter 30, and the resulting digital signals are supplied to the signal processor 20.

To the signal processor 20, as well as video or audio signals obtained by the tuner 32, video or audio signals recorded on a digital versatile disc (DVD) 31A or a video tape 31B played back by the signal playback unit 31 are supplied.

The signal processor 20 executes signal processing on video or audio signals supplied thereto. For example, the signal processor 20 executes processing for enhancing the quality of the signals, such as ordinary noise reduction or digital reality creation (DRC). Furthermore, the signal processor 20 executes image recognition or speech recognition on the video or audio signals supplied thereto to extract one or more specific words (hereinafter referred to as specific words), and supplies the specific words to the checker 25.

DRC is a type of signal conversion. Let it be assumed that signals that are to be converted are image signals, and let an image before conversion be referred to as a first image and an image after conversion be referred to as a second image. In DRC, with each pixel of the second image as a subject pixel, the pixel value of the subject pixel is obtained using the first image and suitable tap coefficients for a class to which the subject pixel belongs.

More specifically, in DRC, for example, using the pixel values of pixels of the first image at positions spatially or temporally neighboring the subject pixel are used as prediction taps for predicting the pixel value of the subject pixel. The pixel value (predicted value) of the subject pixel is obtained by a predetermined predictive calculation using the prediction taps and tap coefficients that are obtained individually for predetermined classes through learning.

For example, when a first-order linear predictive calculation is used as the predetermined predictive calculation, a pixel value y of the second image is obtained according to the following first-order linear equation:

$$y = \sum_{n=1}^{N} w_n x_n \qquad (1)$$

In equation (1), $x_n$ denotes the pixel value of an n-th pixel of the first image among pixels that serve as prediction taps for (the pixel value of) a pixel y of the second image, and $w_n$ denotes an n-th tap coefficient that is multiplied with the pixel value of the pixel that serves as the n-th prediction tap. In equation (1), it is assumed that prediction taps are composed of the pixel values $x_1, x_2, \ldots, x_n$ of N pixels of the first image.

The pixel value y of a pixel of the second image may be obtained according to a second or higher order equation instead of the first-order linear equation expressed as equation (1).

Now, let the true value of the pixel value of a k-th pixel of the second image be denoted by $y_k$, and let a predicted value of the true value $y_k$ obtained according to equation (1) be denoted by $y_k'$. Then, a prediction error $e_k$ between these values can be expressed by the following equation:

$$e_k = y_k - y_{k'} \qquad (2)$$

Since the predicted value $y_k'$ in equation (2) is obtained according to equation (1), substituting $y_k'$ in equation (2) according to equation (1) yields the following equation:

$$e_k = y_k - \left( \sum_{n=1}^{N} w_n x_{n,k} \right) \qquad (3)$$

In equation (3), $x_{n,k}$ denotes the pixel value of an n-th pixel among pixels that serves as prediction taps for a k-th pixel of the second image.

For prediction of the pixel values of pixels of the second image, tap coefficients $w_n$ with which the prediction error $e_k$ according to equation (3) (or equation (2)) becomes 0 are optimal. However, it is generally difficult to obtain such tap coefficients $w_n$ for all the pixels of the second image.

Thus, for example, when the least square method is used as a criterion for determining optimal tap coefficients $w_n$, optimal tap coefficients $W_n$ can be obtained by minimizing the sum E of square errors expressed by the following equation:

$$E = \sum_{k=1}^{K} e_k^2 \qquad (4)$$

In equation (4), K denotes the number of samples of the set of a pixel $y_k$ of the second image and pixels $x_{1,k}, x_{2,k}, \ldots, x_{N,k}$ of the first image that serve as prediction taps for the pixel $y_k$ (the number of samples used in learning for obtaining tap coefficients $w_n$).

The minimum value of the sum E of square errors expressed by equation (4) is given by tap coefficients $w_n$ with which partial differentiation of the sum E becomes 0, as expressed in equation (5):

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \qquad (5)$$

$$(n = 1, 2, \ldots, N)$$

Partial differentiation of equation (3) given earlier with respect to tap coefficients $W_n$ yields the following equations:

$$\frac{\partial e_k}{\partial w_1} = -x_{1,k}, \quad \frac{\partial e_k}{\partial w_2} = -x_{2,k}, \ldots, \frac{\partial e_k}{\partial w_N} = -x_{N,k}, \qquad (6)$$

$$(k = 1, 2, \ldots, K)$$

From equations (5) and (6), the following equations are derived:

$$\sum_{k=1}^{K} e_k x_{1,k} = 0, \sum_{k=1}^{K} e_k x_{2,k} = 0, \ldots \sum_{k=1}^{K} e_k x_{N,k} = 0 \qquad (7)$$

By assigning equation (3) into $e_k$ in equation (7), equation (7) can be expressed by a normal equation expressed by equation (8):

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \qquad (8)$$

The normal equation expressed by equation (8) can be solved for the tap coefficients $W_n$, for example, by using the sweep-out method (Gauss-Jordan elimination).

In DRC, learning is executed in advance, in which a large number of sets of a pixel yk of the second image and pixels $x_{1,k}, x_{2,k}, \ldots, x_{N,k}$ of the first image that serve as prediction taps for the pixel $y_k$ are prepared as learning samples from the first and second images, and the normal equation expressed in equation (8) is solved for each class to obtain optimal tap coefficients $W_n$ (tap coefficients that minimizes the sum E of square errors in this example) for each class. Then, the predictive calculation according to equation (1) is performed using the tap coefficients $w_n$ to convert the first image into the second image.

More specifically, in the learning process, with each pixel $y_k$ of the second image as a subject pixel, the subject pixel $y_k$ is classified into one of a plurality of classes. The classification is based on, for example, the distribution of the pixel values of several pixels of the first image that serve as class taps, spatially or temporally neighboring the subject pixel $y_k$.

Furthermore, in the learning process, for each class, the normal equations expressed in equation (8) is generated using (the pixel value of) a subject pixel yk belonging to the class and the pixels $x_{1,k}, x_{2,k}, \ldots, x_{N,k}$ of the first image that serve as prediction taps for the pixel $y_k$. When the normal equation expressed in equation (8) is obtained for each class using all the learning samples, tap coefficients $w_n$ for each class is obtained by solving the normal equation for each class.

In DRC, when (the pixel value of) a pixel of the second image is obtained, considering the pixel as a subject pixel, the subject pixel is classified similarly to the case of the learning process, thereby determining a class to which the subject pixel belongs. Furthermore, the predictive calculation according to equation (1) is performed using tap coefficients $w_n$ for the class and the pixels $x_{1,k}, x_{2,k}, \ldots, x_{N,k}$ of the first image that serve as prediction taps for the subject pixel, thereby obtaining (a predicted value of) the pixel value of the subject pixel.

By generating the first image used in the learning process by decimating pixels of the second image, tap coefficients $w_n$ that serve to convert an image into an image having a larger number of pixels can be obtained in DRC. Also, when the first image used in the learning process has a lower resolution than the second image, tap coefficients $w_n$ that serve to convert an image into an image having a higher resolution can be obtained in DRC.

Also, by generating the first image used in the learning process by adding noise to the second image, tap coefficients $w_n$ that serve to convert an image having noise into an image with the noise removed can be obtained in DRC.

As described above, through DRC, various types of image conversion can be executed using tap coefficients $w_n$ that are obtained in advance by the learning process. Although DRC is executed on an image in the example described above, for example, DRC may be executed on sound (audio signals).

Of signals having gone through signal processing in the signal processor 20, such as DRC described above, video (image) signals are transferred to the display 11 so that a corresponding image is displayed, and audio signals are supplied to a speaker (not shown) so that a corresponding sound is output.

The mobility-equipped TV 10 includes the receiver 26 as well as the tuner 32 for receiving broadcast signals. For example, the receiver 26 receives a command transmitted from the remote commander 40 in response to a user's operation of the remote commander 40, and supplies the command to the checker 25.

To the checker 25, as well as commands supplied from the receiver 26, specific words extracted from broadcast signals are supplied from the signal processor 20 as described earlier. The checker 25 checks whether a signal supplied thereto represents a command from the receiver 26 or specific words from the signal processor 20. Furthermore, the checker 25 determines an operation mode of the mobility-equipped TV 10 according to the result of the checking, and supplies a mode signal representing the operation mode to the movement controller 22 together with the command from the receiver 26 or the specific words from the signal processor 20.

The operation mode of the mobility-equipped TV 10 is, for example, either mode #1 or mode #2. When a command from the receiver 26 is supplied, the checker 25 determines mode #1 as the operation mode of the mobility-equipped TV 10, and supplies a mode signal representing mode #1 to the movement controller 22 together with the command from the receiver 26. On the other hand, when specific words from the signal processor 20 are supplied, the checker 25 determines mode #2 as the operation mode of the signal processor 20, and supplies a mode signal representing mode #2 to the movement controller 22 together with the specific words from the signal processor 20.

When the mode signal supplied from the checker 25 represents mode #1, the movement controller 22 controls the moving unit 13 and the platform controller 21 according to the command supplied together with the mode signal.

In this case, the moving unit 13 rotates or otherwise controls the rotators (FIGS. 1 and 2) under the control of the movement controller 22, so that the mobility-equipped TV 10 moves according to commands for instructing movement while the commands are being transmitted by user's operations of the remote commander 40.

Furthermore, the platform controller 21 controls the platform 12 under the control of the movement controller 22 so that the TV unit 14 is moved upward or downward or is rotated (panned).

On the other hand, when the mode signal supplied from the checker 25 represents mode #2, on the basis of the specific words supplied together with the mode signal, the movement controller 22 obtains control information for controlling the mobility-equipped TV 10, including a position to which the mobility-equipped TV 10 is to move (a destination of movement). Furthermore, the movement controller 22 requests the current-position obtaining unit 23 to return a current position of the mobility-equipped TV 10, and receives current-position information representing the current position of the mobility-equipped TV 10, supplied from the current-position obtaining unit 23 in response to the request.

When the current-position obtaining unit 23 is aware of an initial position of the mobility-equipped TV 10, i.e., a position of the mobility-equipped TV 10 at the time when the mobility-equipped TV 10 is powered on, and has a movement log representing information regarding movement of the mobility-equipped TV 10 from the initial position to the current position, the current position can be obtained from the initial position and the movement log.

Furthermore, for example, when a camera (imaging device) that is capable of imaging the entire room of the user is attached on the ceiling or the like of the room of the user, the current-position obtaining unit 23 can receive an image of the entire room of the user from the camera and obtain the current position of the mobility-equipped TV 10 on the basis of the image.

Alternatively, for example, the current-position obtaining unit 23 may obtain a current position on the basis of signals received from GPS (Global Positioning System) satellites.

Upon obtaining the current-position information and control information as described above, the movement controller 22 calculates a route from the current position to a position to which the mobility-equipped TV 10 is to move (hereinafter referred to as a target position) on the basis of the current-position information and control information, and controls the moving unit 13 so that the mobility-equipped TV 10 moves along the route. Under the control of the movement controller 22, the moving unit 13 rotates or otherwise controls the rotators 15 (FIGS. 1 and 2) as appropriate, whereby the mobility-equipped TV 10 autonomously travels to the target position along the route calculated by the movement controller 22.

When the mobility-equipped TV 10 has moved to the target position, the movement controller 22 executes a specific process described later until a canceling instruction is issued by the checker 25.

When a command for canceling execution of a specific process is received from the remote commander 40 or specific words indicating canceling of execution of a specific process is supplied from the signal processor 20, the checker 25 supplies a signal representing a canceling instruction to the movement controller 22.

Furthermore, in mode #2, in the end, the mobility-equipped TV 10 executes a specific process on the basis of specific words. Thus, specific words extracted by the signal processor 20 can be considered as a command for executing a specific process.

Figures 7A, 7B:
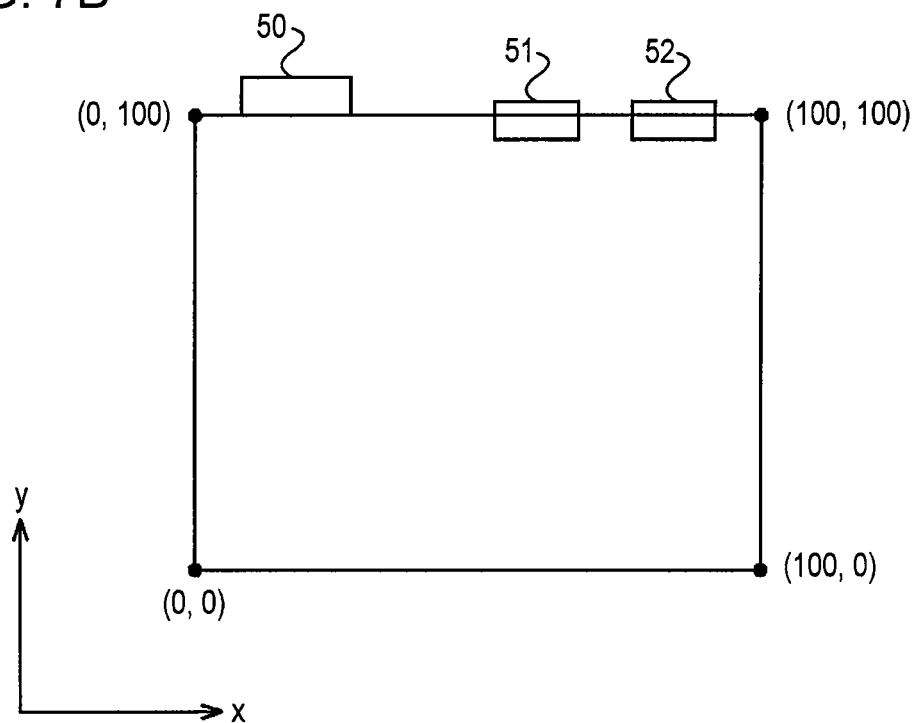
FIGS. 7A and 7B are diagrams for explaining a second table.

FIGS. 6 and 7A show examples of tables stored in the ROM 24 shown in FIG. 5.

The ROM 24 stores a first table and a second table. FIG. 6 shows the first table, and FIG. 7A shows the second table.

In the first table, "specific words" are associated with pieces of "processing information" representing processes that are to be executed in relation to the specific words, as shown in FIG. 6.

In the entry on the first row from the top of the first table shown in FIG. 6, "A Town" and "Thief" are registered as specific words. "A Town" is the name of a town where the house of the user is located. As processing information representing a process that is to be executed in relation to the specific words, processing information representing anti-crime measures is registered.

In the entry on the second row from the top of the first table shown in FIG. 6, "A Town", which is the name of a town where the house of the user is located, and "Flood" are registered as specific words. As processing information representing a process that is to be executed in relation to the specific words, processing information representing anti-flood measures is registered.

The second table is provided for each piece of processing information registered in the first table. FIG. 7A shows an example of a second table provided in relation to a piece of processing information representing anti-crime measures.

In the second table provided in relation to the piece of processing information representing anti-crime measures, in each entry (row), "subject information" representing a subject of an anti-crime measure to take, coordinates representing a position of the subject, and height information representing a height of the subject are registered in association with each other. In the second table, such entries are arranged in descending order of priority of the subjects of the anti-crime measures to take.

The coordinates representing the position of a subject represented by subject information are based on, for example, an xy coordinate system having an origin (0, 0) corresponding to a certain position of the room (house) of the user, as shown in FIG. 7B.

In the second table shown in FIG. 7A, as subjects of anti-crime measures to take, a door 50 and two windows 51 and 52 are registered. Furthermore, (10, 100), (80, 100), and (90, 100) are registered as coordinates of the door 50, the window 51, and the window 52, respectively, and 30, 100, and 100 are registered as height information of the door 50, the window 51, and the window 52, respectively. Furthermore, regarding the priority of the subjects of anti-crime measures to take, the door 50 has the highest priority the window 51 has the next highest priority, and the window 52 has the next highest priority.

In the first table shown in FIG. 6 and the second table shown in FIG. 7A, information can be registered, modified, or deleted, for example, by user's operations of the remote commander 40.

Next, an operation of the mobility-equipped TV 10 shown in FIG. 5 will be described with reference to a flowchart shown in FIG. 8.

First, in step S10, the checker 25 checks whether the mobility-equipped TV 10 has been powered on. When it is determined in step S10 that the mobility-equipped TV 10 has not been powered on, the process returns to step S10 and the same process is repeated.

On the other hand, when it is determined in step S10 that the mobility-equipped TV 10 has been powered on, i.e., electric power for operation has been supplied to the blocks of the mobility-equipped TV 10, the process proceeds to step S11. In step S11, the checker 25 checks whether specific words have been input (supplied) from the signal processor 20 or a command has been input from the receiver 26.

When it is determined in step S11 that neither specific words have been input from the signal processor 20 nor a command has been input from the receiver 26, the process returns to step S11, and the same process is repeated.

On the other hand, when it is determined in step S11 that either specific words have been input from the signal processor 20 or a command has been input from the receiver 26, the process proceeds to step S12. In step S12, the checker 25 checks whether the input to the checker 25 is a command from the receiver 26.

When it is determined in step S12 that the input to the checker 25 is a command from the receiver 26, i.e., when a command has been transmitted from the remote commander 40 in response to a user's operation of the remote commander 40 and the command has been received by the receiver 26 and has been supplied (or is being supplied) to the checker 25, the checker 25 determines mode #1 as the operation mode of the mobility-equipped TV 10, and supplies a mode signal representing mode #1 to the movement controller 22 together with the command from the receiver 26.

Upon receiving the mode signal representing mode #1 from the checker 25 from the checker 25 together with the command, the process proceeds from step S12 to S13 in accordance with the mode signal. In step S13, the movement controller 22 checks whether the command supplied from the checker 25 is a command for instructing a change in the direction or height of the TV unit 14 (the display 11).

When it is determined in step S13 that the command supplied from the checker 25 is a command for instructing a change in the direction or height of the TV unit 14, i.e., when the user has operated the remote commander 40 to change the direction or height of the TV unit 14, the process proceeds to step S14. In step S14, the movement controller 22 controls the platform controller 21 according to the command from the checker 25, and the platform controller 21 controls (drives) the platform 12 under the control of the movement controller 22.

Thus, the platform 12 is rotated or extended or folded upward or downward under the control of the movement controller 22, so that the TV unit 14 fixed on the platform 12 is rotated (panned) or moved upward or downward.

After step S14, the process returns to step S11, and the same processing is repeated. Thus, while the user is operating the remote commander 40 to change the direction or height of the TV unit 14, the platform 12 keeps rotating or moving upward or downward according to the operation.

When it is determined in step S13 that the command supplied from the checker 25 is not a command for instructing a change in the direction or height of the TV unit 14, the process proceeds to step S15. In step S15, the movement controller 22 checks whether the command supplied from the checker 25 is a command for instructing a change in the position of the mobility-equipped TV 10.

When it is determined in step S15 that the command supplied from the checker 25 is not a command for instructing a change in the position of the mobility-equipped TV 10, the process proceeds to step S24.

On the other hand, when it is determined in step S15 that the command supplied from the checker 25 is a command for instructing a change in the position of the mobility-equipped TV 10, i.e., when the user has operated the remote commander 40 to move the mobility-equipped TV 10, the process proceeds to step S16. In step S16, the movement controller 22 drives (controls) the moving unit 13 according to the command from the checker 25.

Thus, the moving unit 13 is moved, and therefore the entire mobility-equipped TV 10 is moved.

After step S16, the process returns to step S11, and the same processing is repeated. Thus, while the user is operating the remote commander 40 to move the mobility-equipped TV 10, the mobility-equipped TV 10 keeps moving according to the operation.

When it is determined in step S12 that the input to the checker 25 is not a command from the receiver 26, i.e., when the input to the checker 25 is specific words from the signal processor 20, the checker 25 determines mode #2 as the operation mode of the mobility-equipped TV 10, and supplies a mode signal representing mode #2 to the movement controller 22 together with the specific words from the signal processor 20.

Upon receiving the mode signal representing mode #2 from the checker 25 together with the specific word from the signal processor 20, the process proceeds from step S12 to step S17. In step S17, the movement controller 22 refers to the first table (FIG. 6) stored in the ROM 24. The process then proceeds to step S18.

In step S18, the movement controller 22 checks whether specific words matching the specific words from the signal processor 20 is registered in the first table.

When it is determined in step S18 that the specific words from the signal processor 20 are not registered in the first table, the process proceeds to step S24.

On the other hand, when it is determined in step S18 that the specific words from the signal processor 20 are registered, i.e., for example, when the specific words from the signal processor 20 are "Thief" and "A town" and an entry including these specific words exists in the first table, the process proceeds to step S19. In step S19, the movement controller 22 recognizes processing information of the entry including the specific words from the signal processor 20, and reads the second table provided for the processing information from the ROM 24.

Thus, for example, in the case where the first table shown in FIG. 6 is stored in the ROM 24, when the specific words from the signal processor 20 are "Thief" and "A town", the second table provided for the processing information representing anti-crime measures, included in the first entry from the top of the first table shown in FIG. 6, i.e., the second table shown in FIG. 7A, is read from the ROM 24.

Furthermore, in step S19, the movement controller 22 refers to the second table read from the ROM 24, and obtains, for example, information included in an entry with the highest priority as control information for controlling the mobility-equipped TV 10.

Thus, for example, when the second table read from the ROM 24 is the second table shown in FIG. 7A, information (subject information, coordinates, and height information) of the entry of "door 50" as the subject of anti-crime measure to take, which has the highest priority, as control information.

Furthermore, in step S19, upon obtaining control information from the second table, the movement controller 22 obtains current-position information representing a current position of the mobility-equipped TV 10 from the current-position obtaining unit 23. The process then proceeds to step S20.

In step S20, the movement controller 22 checks whether the current position of the mobility-equipped TV 10 as represented by the current-position information coincides with the target position of movement of the mobility-equipped TV 10 as represented by coordinates included in the control information obtained in step S19.

When it is determined in step S20 that the current position of the mobility-equipped TV 10 does not coincide with the target position, the process proceeds to step S21. In step S21, the movement controller 22 controls the moving unit 13 so as to move the mobility-equipped TV 10 to the target position. The process then returns to step S20, and the same process is repeated.

Under the control of the movement controller 22, the moving unit 13 rotates or otherwise controls the rotators 15 (FIGS. 1 and 2), whereby the mobility-equipped TV 10 moves towards the target position.

When the mobility-equipped TV 10 reaches the target position through repetition of steps S20 and S21, for example, when the target position is the door 50 and the mobility-equipped TV 10 has moved to the position of the door 50 as shown in FIG. 4, it is determined in step S20 that the current position of the mobility-equipped TV 10 is the target position, so that the process proceeds from step S20 to step S22.

In step S22, the movement controller 22 checks whether a canceling instruction has been issued from the checker 25. When it is determined in step S22 that a canceling instruction has been issued from the checker 25, i.e., when a command requesting canceling of execution of a specific process has been transmitted from the remote commander 40 and the command has been supplied to the movement controller 22 via the receiver 26 and the checker 25, or when specific words supplied from the signal processor 20 to the checker 25 are words indicating canceling of execution of a specific process, the process proceeds to step S24.

When it is determined in step S22 that a canceling instruction has not been issued from the checker 25, the process proceeds to step S23, in which a specific process is executed. When the specific process is exited, the process proceeds to step S24.

In step S24, the checker 25 checks whether a command for turning off power of the mobility-equipped TV 10 has been transmitted from the remote commander 40. When it is determined that a power off command has not been transmitted, the process returns to step S11, and the same process is repeated.

On the other hand, when it is determined in step S24 that a command for turning off power of the mobility-equipped TV 10 has been transmitted from the remote commander 40, i.e., for example, when the user has operated the remote commander 40 to turn off power of the mobility-equipped TV 10 and a command transmitted from the remote commander 40 in response to the operation has been received by the receiver 26 and supplied to the checker 25, the checker 25 stops supply of power to blocks of the mobility-equipped TV 10, whereby the process is exited.

Next, the specific process executed in step S23 shown in FIG. 8 will be described with reference to a flowchart shown in FIG. 9.

Figure 8:
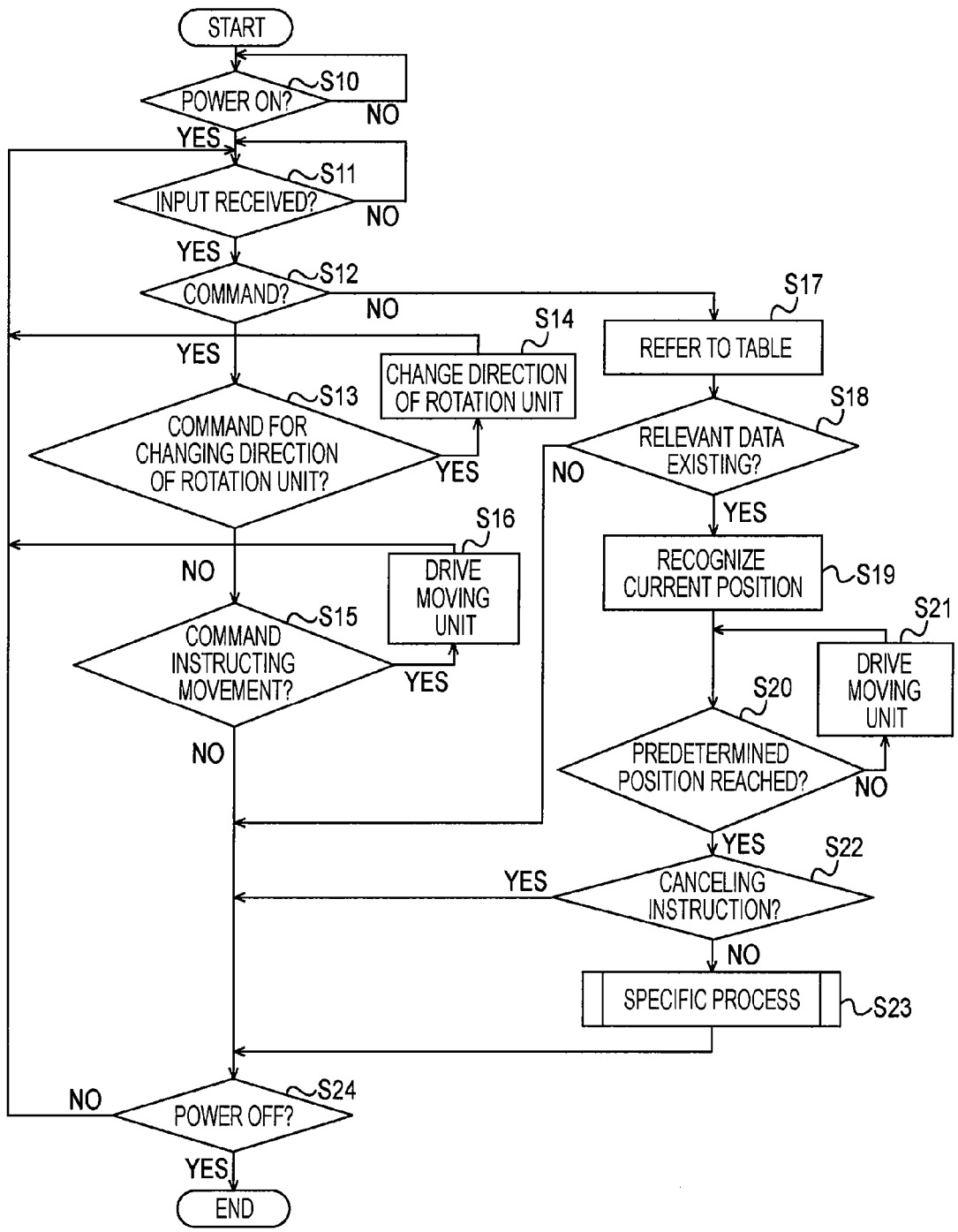
FIG. 8 is a flowchart showing an operation of the mobility-equipped TV.
Figure 9:
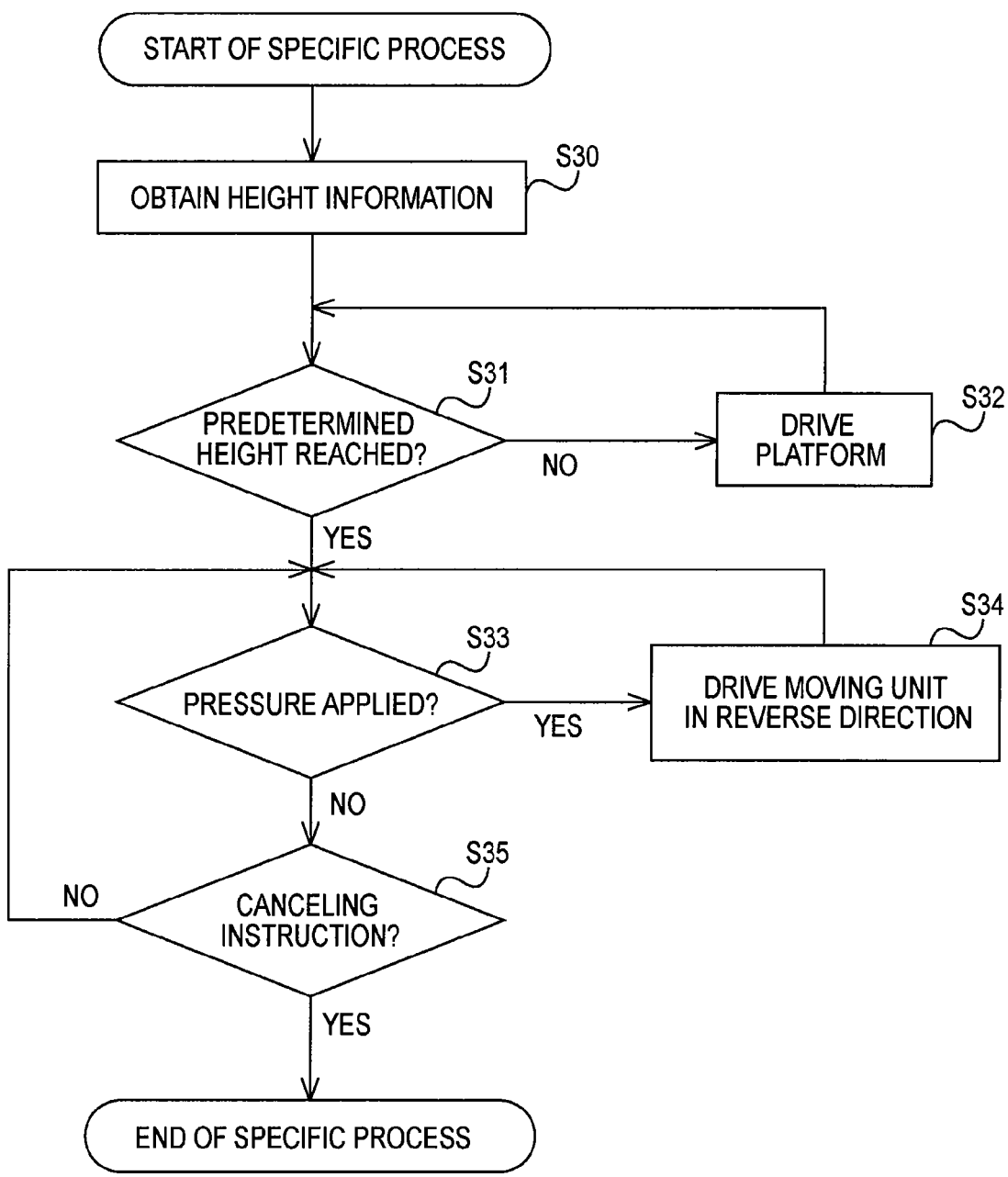
FIG. 9 is a flowchart of a specific process.

The specific process in step S23 shown in FIG. 8 is executed when it is determined in step S20 that the current position of the mobility-equipped TV 10 is the target position represented by coordinates included in control information, i.e., when the mobility-equipped TV 10 is located at the position of the subject represented by the subject information (FIG. 7A) included in the control information.

Thus, for example, when the control information is information included in the first entry from the top in the second table shown in FIG. 7, provided in relation to processing information representing anti-crime measures shown in FIG. 6, the movement controller 22 executes the specific process when the mobility-equipped TV 10 is located at the door 50 with the coordinates (10, 100).

In the specific process, first, in step S30, the movement controller 22 obtains (recognizes) height information included in control information. The process then proceeds to step S31, in which the movement controller 22 checks whether the height of the platform 12 corresponds to the height represented by the height information.

When it is determined in step S31 that the height of the platform 12 does not correspond to the height represented by the height information, the process proceeds to step S32. In step S32, the movement controller 22 controls the platform controller 21, and the platform controller 21 controls (drives) the platform 12 under the control of the movement controller 22.

Thus, the platform 12 is extended or folded upwards or downwards under the control of the movement controller 22.

After step S32, the process returns to step S31, and step S31 is repeated until it is determined that the height of the platform 12 has become the height represented by the height information.

When it is determined in step S31 that the height of the platform 12 has become the height represented by the height information, the process proceeds to step S33. In step S33, the movement controller 22 checks whether an external pressure is being applied to the mobility-equipped TV 10.

That is, in step S33, the movement controller 22 checks whether an external pressure is being applied so as to move the mobility-equipped TV 10, for example, on the basis of a torque being applied to the rotators (FIGS. 1 and 2) of the moving unit 13.

For example, when the control information is the information included in an entry of the second table shown in FIG. 7, an anti-crime measure is to be taken. Thus, as an anti-crime measure, the mobility-equipped TV 10 executes a process of preventing (restricting) entry of an unidentified person to the room (house) of the user.

The entry of an unidentified person to the room of the user occurs through a door, a window, or the like. When the mobility-equipped TV 10 is located at the position of a door or a window, the mobility-equipped TV 10 serves an obstacle against the entry, so that an unidentified person has to move the mobility-equipped TV 10 located at the door or the window in order to enter the room of the user. In order to move the mobility-equipped TV 10, an external pressure is applied so as to move the mobility-equipped TV 10.

Thus, in step S33, as described earlier, the movement controller 22 checks whether an external pressure is being applied to the mobility-equipped TV 10.

When it is determined in step S33 that an external pressure is being applied, i.e., for example, when an unidentified person trying to enter the room of the user is trying to move the mobility-equipped TV 10, the process proceeds to step S34. In step S34, the movement controller 22 drives the moving unit 13 so as to resist the external pressure by applying a pressure (counterforce) in a direction opposite to the direction of the external pressure. The process then returns to step S33.

When it is determined in step S33 that an external pressure is not being applied, the process proceeds to step S35. In step S35, similarly to step S22 shown in FIG. 8, the movement controller 22 checks whether a canceling instruction has been supplied from the checker 25.

When it is determined in step S35 that a canceling instruction has not been issued from the checker 25, the process returns to step S33, and the same process is repeated.

On the other hand, when it is determined in step S35 that a canceling instruction has been supplied from the checker 25, the specific process is exited to return to the calling process.

The specific process may be executed in response to a command transmitted from the remote commander 40 to the mobility-equipped TV 10.

As described above, for example, the mobility-equipped TV 10 includes the TV unit 14 having a function of displaying (presenting) video image (a first function), the moving unit 13 that is capable of traveling so as to move the TV unit 14, the movement controller 22 for driving the moving unit 13, and the receiver 26 for receiving a command from the outside, and the mobility-equipped TV 10 achieves another function (a second function) such as an anti-crime function with the movement controller 22 controlling the moving unit 13 according to the command received.

Although the single mobility-equipped TV 10 is used alone in the example described above, it is possible to use a plurality of mobility-equipped TVs 10 simultaneously.

FIGS. 10 and 11 show the status of usage of a mobility-equipped TV system including a plurality of mobility-equipped TVs 10, which is a type of a set of mobility-equipped actuators.

FIGS. 10 and 11 are perspective views showing situations of the room (house) where a mobility-equipped TV system including three mobility-equipped TVs $10_1$, $10_2$, and $10_3$ is located.

Each of the mobility-equipped TVs $10_1$, $10_2$, and $10_3$ of the mobility-equipped TV system are configured the same as the mobility-equipped TV 10 described with reference to FIGS. 1 to 9.

For example, the user operates the remote commander 40 to send a command to each of the mobility-equipped TVs $10_1$, $10_2$, and $10_3$ so that the position of each of the mobility-equipped TVs $10_1$, $10_2$, and $10_3$ is changed or the direction or height of the display 11 is changed.

Each of the mobility-equipped TVs $10_1$, $10_2$, and $10_3$ moves in response to specific words similarly to the mobility-equipped TV 10.

Each of the mobility-equipped TVs $10_1$, $10_2$, and $10_3$, when moving in response to specific words, obtains, as control information, information of an entry with a highest priority among the entries in a second table read from the ROM 24, and moves to a target position represented by coordinates included in the control information, as described with reference to a flowchart shown in FIG. 8.

Thus, for example, when the second table shown in FIG. 7A is read from the ROM 24 in each of the mobility-equipped TVs $10_1$, $10_2$, and $10_3$, each of the mobility-equipped TVs $10_1$, $10_2$, and $10_3$ moves to the position of the door 50.

Thus, when one of the mobility-equipped TVs $10_1$, $10_2$, and $10_3$ has reached the position of the door 50 than the other two, the other two mobility-equipped TVs are not allowed to reach the position of the door 50 due to the mobility-equipped TV that has already reached the position.

Thus, when a mobility-equipped TV is not able to reach the target position represented by coordinates included in the control information within a predetermined time, the mobility-equipped TV newly obtains, as control information, information of an entry having a next highest priority among the entries of the second table, and moves to a target position represented by coordinates included in the control information.

Thus, each of the mobility-equipped TVs $10_1$, $10_2$, and $10_3$, when moving in response to specific words, obtains, as control information, the entry of the door 50, having the highest information in the second table shown in FIG. 7A, and moves toward the door 50.

For example, when the mobility-equipped TV $10_1$ among the mobility-equipped TVs $10_1$ to $10_3$ has first reached the position of the door 50, the other mobility-equipped TVs $10_2$ and $10_3$ are not allowed to reach the position of the door 50. Thus, the mobility-equipped TVs $10_2$ and $10_3$ newly obtain, as control information, the entry of the window 51, having the second highest priority in the second table shown in FIG. 7A, and moves toward the window 51.

Then, for example, when the mobility-equipped TV $10_2$ has first reached the position of the window among the mobility-equipped TVs $10_2$ and $10_3$, the other mobility-equipped TV $10_3$ is not allowed to reach the position of the window 51. Thus, the mobility-equipped TVs $10_3$ newly obtains, as control information, the entry of the window 52, having the third highest priority in the second table shown in FIG. 7A, and moves toward the window 52.

Thus, as shown in FIG. 11, the mobility-equipped TV $10_1$ moves to the position of the door 50, the mobility-equipped TV $10_2$ moves to the position of the window 51, and the mobility-equipped TV $10_3$ moves to the position of the window 52, and restrict entry and exit through the room via the door 50, the window 51, and the window 52, respectively.

That is, the plurality of mobility-equipped TVs $10_1$ to $10_3$ shares the responsibility of executing anti-crime measures through mutual cooperation.

The mobility unit 16 (FIG. 5) can be attached to a piece of furniture such as a chest for containment or a partition for dividing a room. In this case, mobility-equipped furniture can be constructed. Furthermore, in the case of such mobility-equipped furniture, when the furniture attached to the mobility unit 16 has a door or a drawer, a mechanism for opening or closing the door or the drawer according to an operation of the remote commander 40 may be provided.

Figure 12:
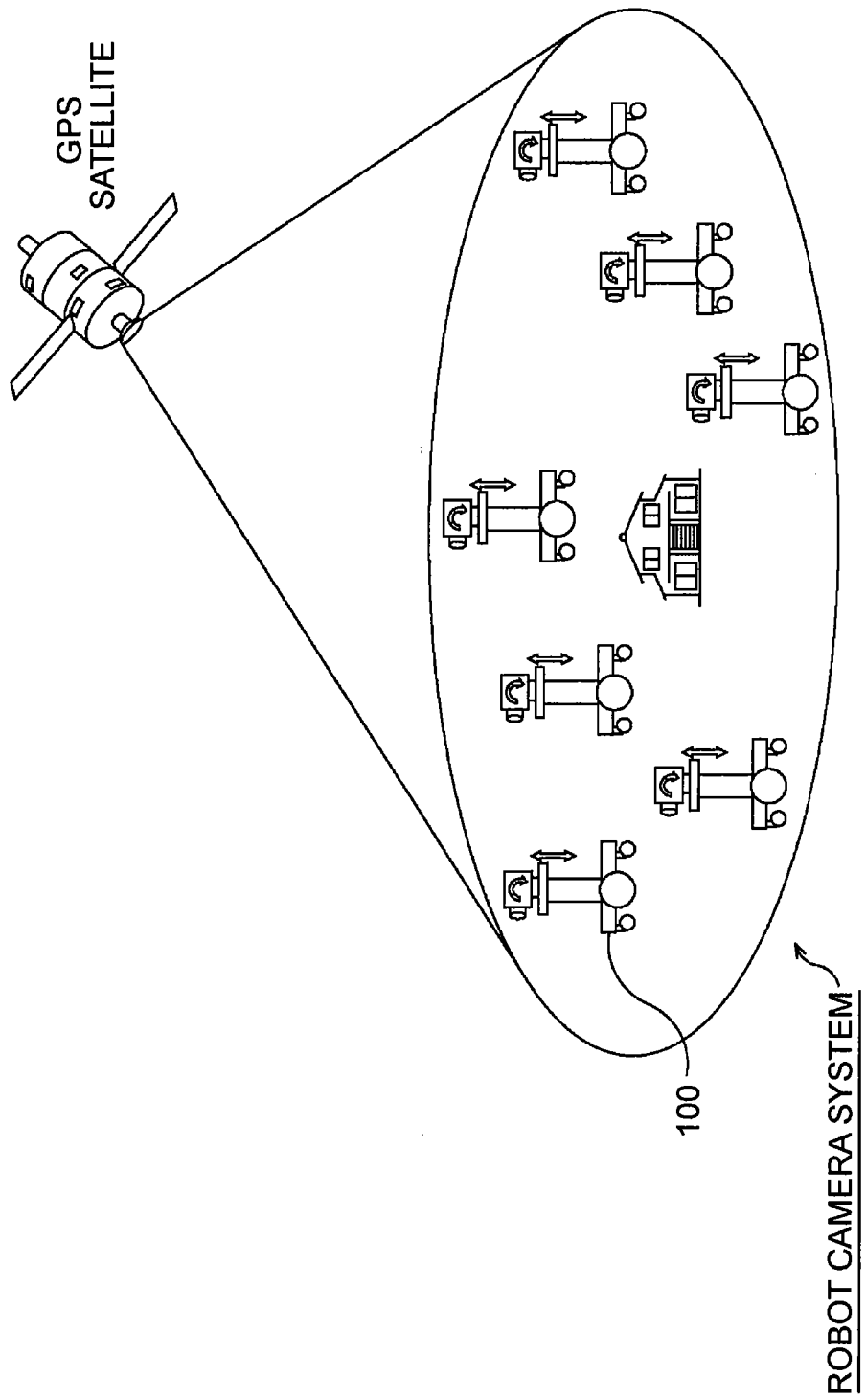
FIG. 12 is a diagram showing an example configuration of a robot camera system according to an embodiment of the present invention.

FIG. 12 shows an example configuration of a robot camera system according to an embodiment of the present invention.

The robot camera system is constructed of one or more robot cameras including a robot camera 100. For example, each of the one or more robot cameras obtains its own current position based on signals from GPS satellites, and executes processing on the basis of the current position. Thus, when the robot camera system is constructed of a plurality of robot cameras, each of the plurality of robot cameras shares the responsibility of executing processing for achieving a certain function by mutually cooperating with the other robot cameras.

For example, the robot camera system provides a surveillance function. In this case, each of the robot cameras of the robot camera system determines a range in which the robot camera is to assume responsibility of surveillance in a surveillance area that is to be covered by the robot system as a whole, on the basis of its current position, the number of other robot cameras existing nearby, and so forth, and executes surveillance in that range. Since each of the robot cameras determines a range in which the robot camera is to assume responsibility of surveillance and executes surveillance in that range, the robot camera system provides a surveillance function of executing surveillance in the entire surveillance area.

The robot camera 100 is a type of mobility-equipped sensor, which is a new type of robot. A mobility-equipped sensor refers to a "sensor" that is capable of changing its position, and the "sensor" herein refers to an object that is capable of obtaining external information. Thus, the sensor may refer to a temperature, sensor, a pressure sensor, or devices that measure (sense) other physical amounts, and may also refer to a camera that captures an optical image, a microphone that collects sound, and so forth.

Figure 13:
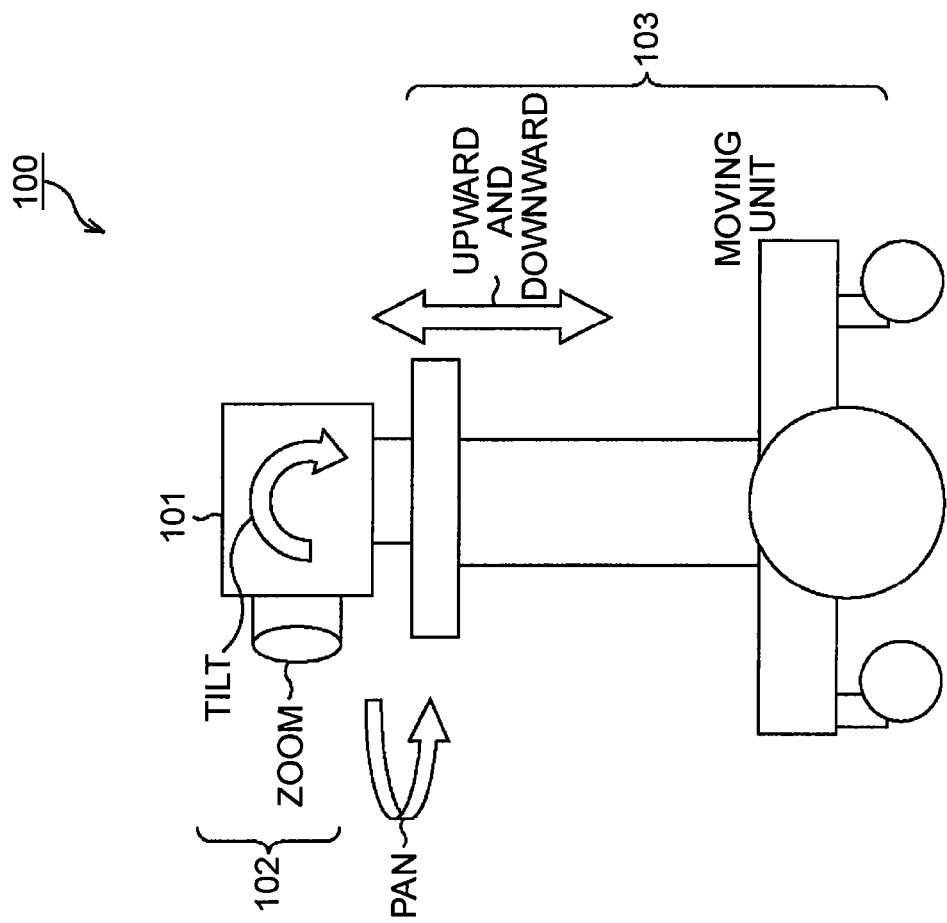
FIG. 13 is a right side view showing an example external configuration of a robot camera.

FIG. 13 is right side view showing an external configuration of the robot camera 100 shown in FIG. 12. FIG. 14 is a block diagram showing an example functional configuration of the robot camera 100.

As shown in FIGS. 13 and 14, the robot camera 100 includes an imager (camera) 101 for obtaining (capturing) an image (carrying out imaging), a platform and zoom mechanism 102 for controlling pan, tilt, and zoom (in and out) of the imager 101, and a movement mechanism 103 for moving the imager 101 and the platform and zoom mechanism 102 (and therefore the entire robot camera 100).

Furthermore, as shown in FIG. 14, the robot camera 100 includes an object specifying unit 104 for specifying a feature of an object, an object storage unit 105 for storing the feature of the object specified by the object specifying unit 104, an image processor for processing an image obtained by the imager 101, an image checker 107 for comparing the image processed by the image processor 106 with the feature of the object stored in the object storage unit 105 and determining whether an object having the feature specified by the object specifying unit 104 is included in the image obtained by the imager 101 on the basis of the result of the comparison, an amount-of-control calculator 108 for calculating an amount of control of the platform and zoom mechanism 102 and the movement mechanism 103 and controlling the platform and zoom mechanism 102 and the movement mechanism 103 according to the amount of control, a platform and zoom controller 109 for controlling the platform and zoom mechanism 102 under the control of the amount-of-control calculator 108, and a movement controller 110 for controlling the movement mechanism 103.

Furthermore, the robot camera 100 has a transmitter 111, an antenna 11A, a receiver 112, an antenna 112A, a position-information detector 113, an antenna 113A, a ROM-table storage unit 114, and a speaker 115.

The transmitter 111 transmits signals via the antenna 111A, and the receiver 112 receives signals via the antenna 112A. By transmitting signals by the transmitter 111 and receiving signals by the receiver 112, the robot camera 100 carries out (wireless) communications with other robot cameras or other devices.

The position-information detector 113 receives signals from GPS satellites via the antenna 113A, and obtains the current position of the robot camera 100 itself on the basis of the signals.

The ROM-table storage unit 114 stores a ROM table having a list of range information for determining a coverage area of surveillance by a single robot camera. The ROM table will be described later in detail.

The speaker 115 outputs an alarm (a threatening sound) under the control of the amount-of-control calculator 108.

Figure 15:
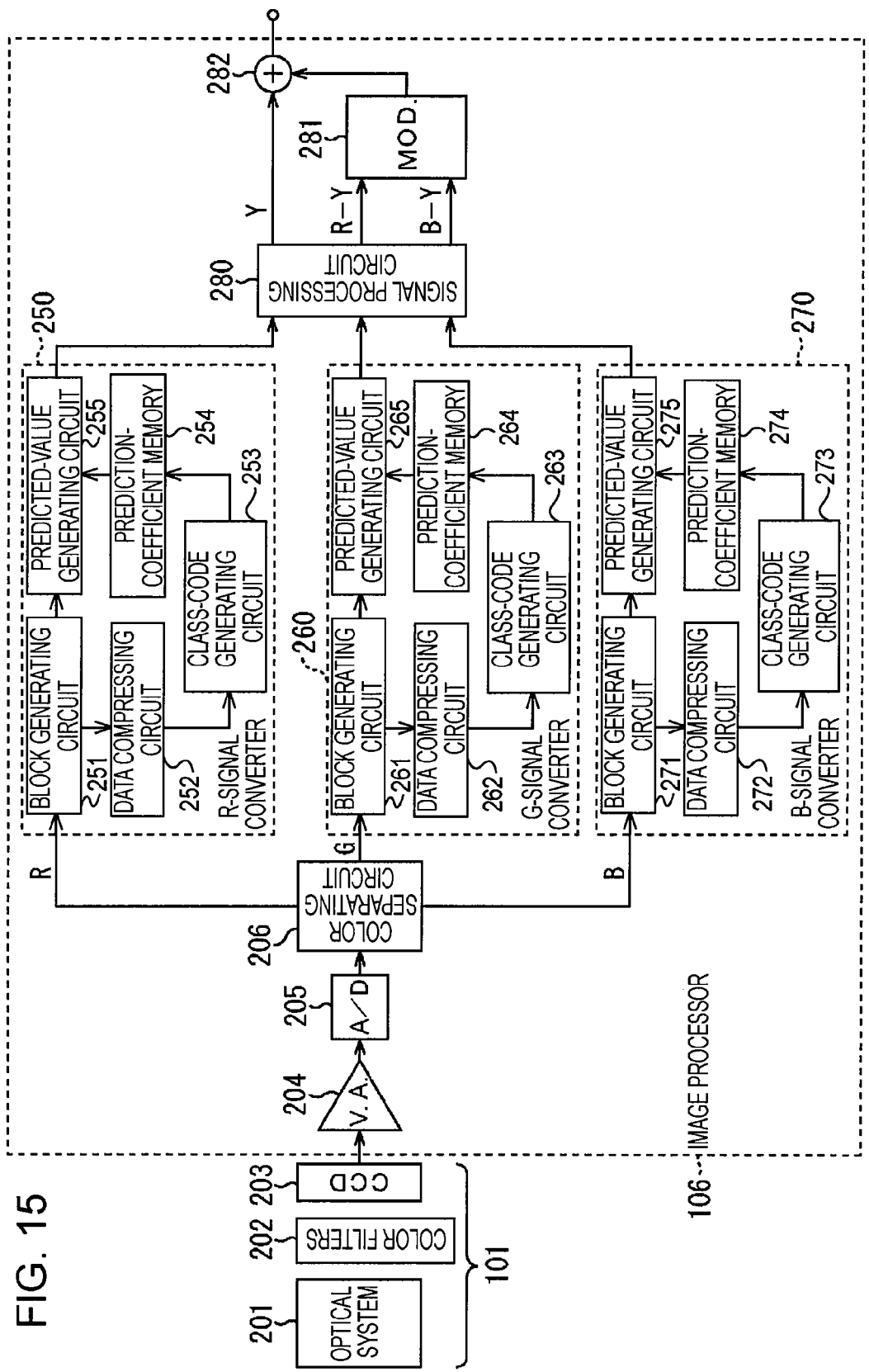
FIG. 15 is a block diagram showing example functional configurations of an imager and an image processor.

FIG. 15 shows example configurations of the imager 101 and the image processor 106 shown in FIG. 14.

In the embodiment shown in FIG. 15, in the imager 101, only one image sensor, such as a CCD (Charge Coupled Device) or CMOS (Complementary Metal Oxide Semiconductor) imager, is used to extract a red signal component, a green signal component, and a blue signal component corresponding to three primary colors of light, and these signal components are converted into high-resolution signal components and the high-resolution signal components are combined to generate a high-resolution composite video image signal. Alternatively, three image sensors that respectively receive signals corresponding to the three primary colors of light may be provided.

The signal components before conversion into high-resolution signal components will be considered as standard-definition signal components and referred to as SD signals, and the signal components after conversion will be considered as high-definition signal components and referred to as HD signals.

Referring to FIG. 15, the imager 101 includes an optical system 201, a color filter 202, and a CCD 203. The image processor 106 includes a video amp (V.A.) 204, an A/D conversion circuit 205, a color separation circuit 206, an R-signal converter 250, a G-signal converter 260, a B-signal converter 270, a signal processing circuit 280, a modulation circuit 281, and an adder 282.

The optical system 201 formed by a lens or the like receives light from an object (captured light). The captured light incident on the optical system 201 is cast on the CCD 203 via the color filter 202. The color filter 202 is, for example, a complementary filter composed of a yellow filter, a cyan filter, and a magenta filter. The captured light incident on the CCD 203 via the color filter 202 undergoes photoelectric conversion by the CCD 203, and the resulting signals are supplied to the video amp 204 as captured image signals. The captured image signals are amplified by a certain gain by the video amp 204, and the amplified signals are supplied to the A/D conversion circuit 205. The captured image signals are converted into digital signals having a predetermined number of bits in the A/D conversion circuit 205. The captured image signals converted into digital signals in the A/D conversion circuit 205 are supplied to the color separation circuit 206.

The color separation circuit 206 separates the input digital captured image signals into an R signal component, a G signal component, and a B signal component, and supplies these signal components to the R-signal converter 250, the G-signal converter 260, and the B-signal converter 270.

The R-signal converter 250, the G-signal converter 260, and the B-signal converter 270 executes, for example, the DRC process described earlier on the signals supplied thereto, thereby converting the signals into high-resolution signals.

More specifically, the R-signal converter 250 includes a block generating circuit 251 that divides the R-signal component supplied from the color separation circuit 206 into a plurality of blocks, a data compressing circuit 252 that compresses the R-signal component supplied from the block generating circuit 251 on a block-by-block basis, a class-code generator 253 that generates a class code representing a class determined from a pattern of levels of the R-signal component in the individual blocks of the R-signal component compressed in the data compressing circuit 252, a prediction-coefficient memory 254 that outputs prediction coefficients (tap coefficients $w_n$) associated with the class code supplied from the class-code generating circuit 253, and a predicted-value generating circuit 255 that performs a predictive calculation for the individual blocks of the R-signal component output from the block generating circuit 251 using the prediction coefficients supplied from the prediction-coefficient memory 254, thereby generating an R-signal component having a resolution higher than the resolution of the R-signal component output from the color separation circuit 206.

The G-signal converter 260 includes a block generating circuit 261 that divides the G-signal component supplied from the color separation circuit 206 into a plurality of blocks, a data compressing circuit 262 that compresses the G-signal component supplied from the block generating circuit 261 on a block-by-block basis, a class-code generator 263 that generates a class code representing a class determined from a pattern of levels of the G-signal component in the individual blocks of the G-signal component compressed in the data compressing circuit 262, a prediction-coefficient memory 264 that outputs prediction coefficients associated with the class code supplied from the class-code generating circuit 263, and a predicted-value generating circuit 265 that performs a predictive calculation for the individual blocks of the G-signal component output from the block generating circuit 261 using the prediction coefficients supplied from the prediction-coefficient memory 264, thereby generating a G-signal component having a resolution higher than the resolution of the G-signal component output from the color separation circuit 206.

The B-signal converter 270 includes a block generating circuit 271 that divides the B-signal component supplied from the color separation circuit 206 into a plurality of blocks, a data compressing circuit 272 that compresses the B-signal component supplied from the block generating circuit 271 on a block-by-block basis, a class-code generator 273 that generates a class code representing a class determined from a pattern of levels of the B-signal component in the individual blocks of the B-signal component compressed in the data compressing circuit 272, a prediction-coefficient memory 274 that outputs prediction coefficients associated with the class code supplied from the class-code generating circuit 273, and a predicted-value generating circuit 275 that performs a predictive calculation for the individual blocks of the B-signal component output from the block generating circuit 271 using the prediction coefficients supplied from the prediction-coefficient memory 274, thereby generating a B-signal component having a resolution higher than the resolution of the B-signal component output from the color separation circuit 206.

The high-resolution R-signal component, the high-resolution G-signal component, and the high-resolution B-signal component, output from the R-signal converter 250, the G-signal converter 260, and the B-signal converter 270, respectively, are supplied to the signal processing circuit 280.

The signal processing circuit 280 executes predetermined signal processing and matrix operation on the high-resolution R-signal component, the high-resolution G-signal component, and the high-resolution B-signal component supplied thereto, thereby generating a high-resolution luminance signal Y and high-resolution chrominance signals R-Y and B-Y. The configuration and principles of operation of the signal processing circuit 280 are well known, so that detailed description thereof will be omitted.

The high-resolution chrominance signals R-Y and B-Y are supplied to the modulation circuit 281. The modulation circuit 281 performs orthogonal biaxial (two-phase) modulation on a chrominance subcarrier signal using the high-resolution chrominance signals R-Y and B-Y generated in the signal processing circuit 280, and supplies the resulting high-resolution carrier chrominance signal (hereinafter referred to as the chrominance signal) to one input terminal of the adder 282. To the other input terminal of the adder 282, the high-resolution luminance signal Y is supplied from the signal processing circuit 280. The high-resolution luminance signal Y and the high-resolution chrominance signal supplied from the modulation circuit 281 are added together to generate a high-resolution digital composite video signal, and the high-resolution digital composite signal is output to the image checker 107.

In the imager 101 and the image processor 106 configured as described above, a captured light incident on the CCD 203 via the optical system 201 and the color filter 202 undergoes photoelectric conversion in the CCD 203, and the resulting captured image signal is supplied to the video amp 204. The video amp 204 amplifies the captured image signals supplied from the CCD 203 to certain levels, and supplies the amplified signals to the A/D conversion circuit 205. The A/D conversion circuit 205 converts the captured image signals supplied from the video amp 204 into digital captured image signals, and supplies the digital captured image signals to the color separation circuit 206. The color separation circuit 206 separates the digital captured image signals into an R-signal component, a G-signal component, and a B-signal component. The R-signal component, G-signal component, and B-signal component are supplied from the color separation circuit 206 to the R-signal converter 250, the G-signal converter 260, and the B-signal converter 270, and converted into a high-resolution R-signal component, a high-resolution G-signal component, and a high-resolution B-signal component, respectively. The high-resolution R-signal component, high-resolution G-signal component, and high-resolution B-signal component are supplied to the signal processing circuit 280, and a high-resolution luminance signal Y and high-resolution chrominance signals R-Y and B-Y are generated from these signal components.

The high-resolution luminance signal Y and high-resolution chrominance signals R-Y and B-Y are supplied to the modulation circuit 281, and the modulation circuit 281 performs orthogonal biaxial modulation on a chrominance subcarrier signal to convert these signals into a high-resolution chrominance signal. The high-resolution luminance signal Y output from the signal processing circuit 280 and the high-resolution chrominance signal output from the modulation circuit 281 are added together by the adder 282 to obtain a high-resolution composite video signal.

Next, the DRC processing executed by the R-signal converter 250, the G-signal converter 260, and the B-signal converter 270 shown in FIG. 15 will be described.

Since the R-signal converter 250, the G-signal converter 260, and the B-signal converter 270 execute the DRC processing in similar manners, the following description will be given in the context of the DRC processing executed by the R-signal converter 250 as an example.

In the R-signal converter 250, SD signals (R signal components thereof) with each pixel represented by 8 bits are supplied from the color separation circuit 206 to the block generating circuit 251, for example, at a predetermined sampling frequency in order of raster scanning.

The block generating circuit 251 converts the data (SD signals) arranged in order of raster scanning into data arranged in order of one-dimensional blocks, two-dimensional blocks, or three-dimensional blocks, and outputs the data to the data compressing circuit 252 and the predicted-value generating circuit 255.

More specifically, the block generating circuit 251 chooses an HD pixel for which a pixel value is to be obtained through the DRC processing as a subject pixel among the pixels of HD signals (HD pixels), and outputs several pixels of SD signals (SD pixel) spatially or temporally adjacent to the subject pixel to the data compressing circuit 252 and the predicted-value generating circuit 255 as a block used for obtaining the subject pixel.

The block output from the block generating circuit 251 to the data compressing circuit 252 and the block output from the block generating circuit 251 to the predicted-value generating circuit 255 in relation to the subject pixel may be composed of different SD pixels. The block output from the block generating circuit 251 to the data compressing circuit 252 corresponds to class taps described earlier in relation to the DRC processing, and the block output from the block generating circuit 251 to the predicted-value generating circuit 255 corresponds to prediction taps described earlier in relation to the DRC processing.

The data compressing circuit 252 and the class-code generating circuit 253 perform classification in the DRC processing. The classification is performed on the basis of the pattern of distribution of the levels of (the pixel values of) the SD pixels in the block output from the block generating circuit 251. However, when the pixel values (8 bits in this example) of the SD pixels are directly used for the classification, the number of classes is too large. Thus, the data compressing circuit 252 is provided to compress the number of bits of (the pixel values of) the SD pixels in the block relevant to the classification.

The number of bits of the SD pixels may be compressed, for example, by ADRC (Adaptive Dynamic Range Coding). In ADRC, a minimum value of the pixel values of the SD pixels in the block is subtracted from the individual pixel values of the SD pixels in the block, and the results of the subtraction are requantized by a number of bits (e.g., 1 bit) less than the number of bits of the SD pixels.

After compressing the number of bits of the SD pixels in the block supplied from the block generating circuit 251, the data compressing circuit 252 supplies a block composed of SD pixels each having the compressed number of bits (compressed SD pixels) to the class-code generating circuit 253. The class-code generating circuit 253 arranges the pixel values of the compressed SD pixels in the block supplied from the data compressing circuit 252 in a predetermined order, and supplies the resulting sequence of pixel values to the prediction-coefficient memory 254 as a class code.

The prediction-coefficient memory 254 stores tap coefficients (also referred to as prediction coefficients) for each class at an address representing the class, obtained through the learning described earlier in relation to the DRC processing. The prediction-coefficient memory 254 supplies prediction coefficient stored at an address represented by the class code supplied from the class-code generating circuit 253 to the predicted-value generating circuit 255.

The predicted-value generating circuit 255 performs the predictive calculation according to equation (1) using (the pixel values of) the SD pixels $x_n$ in the block (prediction taps) supplied from the block generating circuit 251 the prediction coefficients (tap coefficients) $w_n$ supplied from the prediction-coefficient memory 254, thereby obtaining (predicted values of) the pixel values of the subject pixel (HD pixel).

Next, the ROM table stored in the ROM-table storage unit 114 shown in FIG. 14 will be described with reference to FIGS. 16A to 18B.

FIGS. 16A and 16B relate to a first example of the ROM table.

As an example, let it be assumed that a surveillance area that is to be covered as a whole by the robot system shown in FIG. 12 is an area within a circle centered at a certain reference position and having a predetermined radius (25 m in this example), as shown in FIG. 16A.

In this case, the ROM table includes registered sets of the number of robot cameras (the number of robots) that are to be in charge of surveillance in the circular surveillance area and range information for determining a coverage area that is to be covered by a single robot camera when the surveillance area is covered by that number of robot cameras, as shown in FIG. 16B.

As the range information, the ROM table shown in FIG. 16B includes central angles for (equally) dividing the circular surveillance area into coverage areas corresponding to sectors centered at the reference position. More specifically, according to the ROM table shown in FIG. 16B, when the number of robots is 1, 2, 3, 4, and so forth, the range information is 360 degrees, 180 degrees, 120 degrees, 90 degrees, and so forth, respectively. Thus, when the number of robots is n, range information representing 360/n degrees is associated with the number of robots n.

When the ROM table shown in FIG. 16B is stored in the ROM-table storage unit 114 shown in FIG. 14, the robot camera 100 recognizes the number of robots of robot cameras that are to be in charge of surveillance in the surveillance area as will be described later, and obtains range information associated with the number of robots of robot cameras that are to be in charge of surveillance in the surveillance area by referring to the ROM table shown in FIG. 16B. Then, the robot camera 100 recognizes a coverage area that is to be covered by a single robot camera on the basis of the range information.

For example, when the number of robots of robot cameras that are to be in charge of surveillance in the surveillance area is 4, the robot camera 100 obtains "range information" representing 90 degrees, associated with the "number of robots" of 4, by referring to the ROM table shown in FIG. 16B. In this case, as coverage areas, the robot camera 100 recognizes areas corresponding to four sectors with central angles of 90 degrees, formed by equally dividing the circular surveillance area into four by straight lines passing through the center of the surveillance area, as shown in FIG. 16A.

Upon recognizing the coverage areas, the robot camera 100 determines one of the coverage areas as a range of movement of the robot camera 100 itself, and captures images of objects while moving within the range of movement.

FIGS. 17A and 17B relate to a second example of the ROM table.

As an example, let it be assumed that the surveillance area that is to be covered as a whole by the robot system shown in FIG. 12 is an area within a square having a center of gravity at a reference position and having sides with a predetermined length (50 m in this example), as shown in FIG. 17A.

In this case, the ROM table includes registered sets of the number of robot cameras (the number of robots) that are to be in charge of surveillance in the square surveillance area and range information for determining a coverage area that is to be covered by a single robot camera when the surveillance area is covered by that number of robot cameras, as shown in FIG. 17B.

As the range information, the ROM table shown in FIG. 17B includes the lengths of each side of a square for (equally) dividing the square surveillance area into coverage areas corresponding to squares of the same size. More specifically, according to the ROM table shown in FIG. 17B, when the number of robots is 1 to 3, 4 to 15, 16 to 31, and so forth, the range information is 50 m, 25 m, 12.5 m, and so forth, respectively.

When the ROM table shown in FIG. 17B is stored in the ROM-table storage unit 114 shown in FIG. 14, the robot camera 100 recognizes the number of robots of robot cameras that are to be in charge of surveillance in the surveillance area as will be described later, and obtains range information associated with the number of robots of robot cameras that are to be in charge of surveillance in the surveillance area by referring to the ROM table shown in FIG. 17B. Then, the robot camera 100 recognizes a coverage area that is to be covered by a single robot camera on the basis of the range information.

For example, when the number of robots of robot cameras that are to be in charge of surveillance in the surveillance area is 4, the robot camera 100 obtains "range information" representing 25 m, associated with the "number of robots" of 4 to 15, by referring to the ROM table shown in FIG. 17B. In this case, as coverage areas, the robot camera 100 recognizes areas corresponding to four squares formed by equally dividing the square surveillance area into four squares with each side having a length of 25 m, as shown in FIG. 17A.

Upon recognizing the coverage areas, the robot camera 100 determines one of the coverage areas as a range of movement of the robot camera 100 itself, and captures images of objects while moving within the range of movement, as described with reference to FIGS. 16A and 16B.

Figures 18A, 18B:
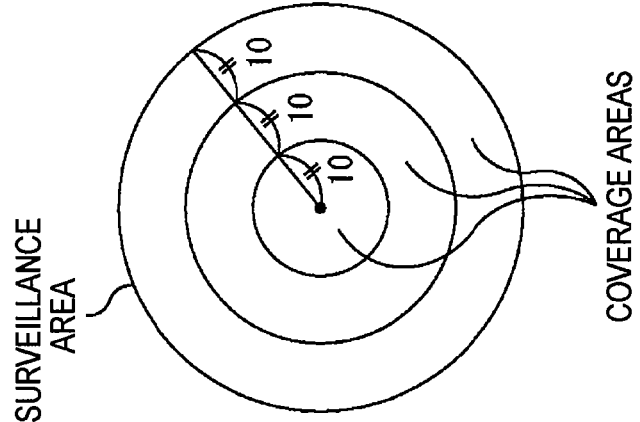
FIGS. 18A and 18B are diagrams for explaining a third example of a ROM table.

FIGS. 18A and 18B relate to a third example of the ROM table.

As an example, let it be assumed that the surveillance area that is to be covered as a whole by the robot system shown in FIG. 12 is an area within a circle centered at a reference position and having a variable radius, as shown in FIG. 18A.

In this case, the ROM table includes registered sets of the number of robot cameras (the number of robots) that are to be in charge of surveillance in the circular surveillance area and range information for determining a coverage area that is to be covered by a single robot camera when the surveillance area is covered by that number of robot cameras, as shown in FIG. 18B.

As the range information, the ROM table shown in FIG. 18B includes the radii of the circular surveillance area for enlarging or reducing the square surveillance area in the radial direction. More specifically, according to the ROM table shown in FIG. 18B, when the number of robots is 1, 2, 3, and so forth, the range information is 10 m, 20 m, 30 m, and so forth, respectively. That is, when the number of robots is n, range information representing 10×n (meters) is associated with the number of robots n.

When the ROM table shown in FIG. 18B is stored in the ROM-table storage unit 114 shown in FIG. 14, the robot camera 100 recognizes the number of robots of robot cameras that are to be in charge of surveillance in the surveillance area as will be described later, and obtains range information associated with the number of robots of robot cameras that are to be in charge of surveillance in the surveillance area by referring to the ROM table shown in FIG. 18B. Then, the robot camera 100 recognizes a coverage area that is to be covered by a single robot camera on the basis of the range information.

For example, when the number of robots of robot cameras that are to be in charge of surveillance in the surveillance area is 3, the robot camera 100 obtains "range information" representing 30 m, associated with the "number of robots" of 3, by referring to the ROM table shown in FIG. 18B. In this case, the robot camera 100 determines a circular surveillance area on the basis of the range information, and divides the circular surveillance area with respect to the radial direction into three areas corresponding to the number of robots, as shown in FIG. 18A.

More specifically, the robot camera 100 determines a circular area with a radius of 30 m as the circular surveillance area on the basis of the "range information" representing 30 m, and equally divides the surveillance area with respect to the radial direction into three correspondingly to the number of robots, thereby dividing the surveillance area into three donut-shaped areas (the innermost area is circular), as shown in FIG. 18A.

Then, the robot camera 100 recognizes the three areas formed by the division of the surveillance area as coverage areas.

Upon recognizing the coverage areas, the robot camera 100 determines one of the coverage areas as a range of movement of the robot camera 100 itself, and captures images of objects while moving within the range of movement.

When the ROM table shown in FIG. 16B or FIG. 17B is used, the size of the surveillance area is predetermined, and the size of a coverage area that is to be covered by a single robot camera decreases as the number of robots of robot cameras that are to be in charge of surveillance in the surveillance area increases.

In contrast, when the ROM table shown in FIG. 18B is used, the size of the surveillance area increases as the number of robots of robot cameras that are to be in charge of surveillance in the surveillance area increases.

The reference positions of the surveillance areas shown in FIGS. 16A to 18A may be, for example, the position of a dwelling of a specific person.

Next, processes executed by the robot camera 100 in the robot system shown in FIG. 12 will be described with reference to flowcharts shown in FIGS. 19 to 21.

First, a process executed by the robot camera 100 to determine a range of its own movement will be described with reference to a flowchart shown in FIG. 19.

In the robot camera 100, in step S101, the amount-of-control calculator 108 checks whether a predetermined time (e.g., 30 minutes) has elapsed since a range of movement was determined last time.

The amount-of-control calculator 108 has an internal clock for keeping time, and the amount-of-control calculator 108 executes step S101 by referring to the time indicated by the clock. The times indicated by the clocks of all the robot cameras in the robot system shown in FIG. 12 are synchronized, for example, on the basis of signals from GPS satellites received by the position-information detector 113.

When it is determined in step S101 that the predetermined time has not elapsed, the process returns to step S101 and the same process is repeated.

On the other hand, when it is determined in step S101 that the predetermined time has elapsed, the process proceeds to step S102. In step S102, the amount-of-control calculator 108 controls the transmitter 111 so that a unique robot ID (identifier) assigned to the robot camera 100 is transmitted to other robot cameras via the antenna 111A.

All the robot cameras in the robot system shown in FIG. 12 have unique robot IDs individually assigned thereto, and the robot IDs are stored in an internal memory (not shown) of the amount-of-control calculator 108. In step S102, the amount-of-control calculator 108 transmits a robot ID stored in its internal memory via the transmitter 111 and the antenna 111A.

After step S102, the process proceeds to step S103, in which the amount-of-control calculator 108 receives robot IDs transmitted from other robot cameras and temporarily stores the robot IDs.

Figure 19:
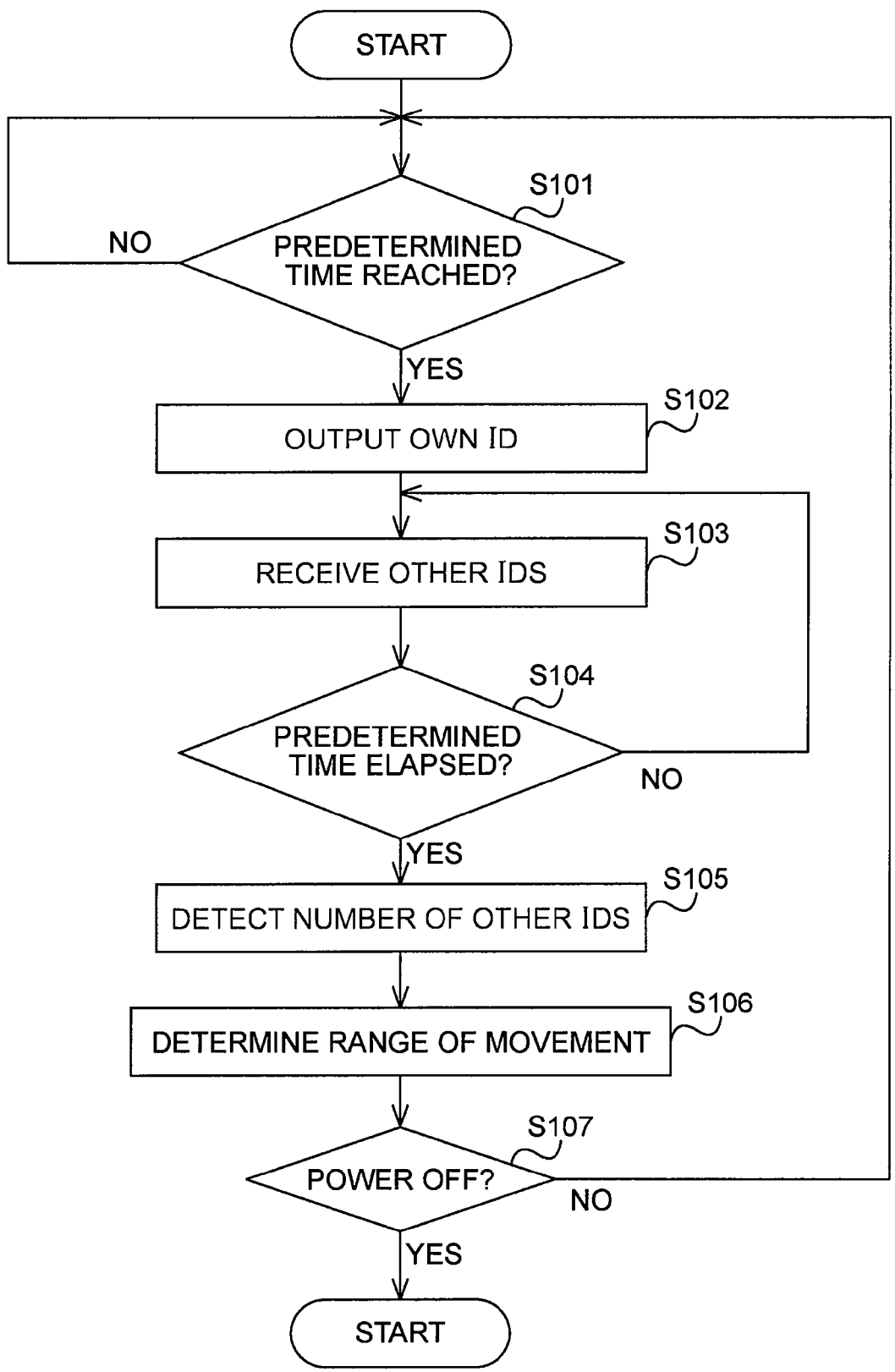
FIG. 19 is a flowchart of a process executed by the robot camera.
Figure 20:
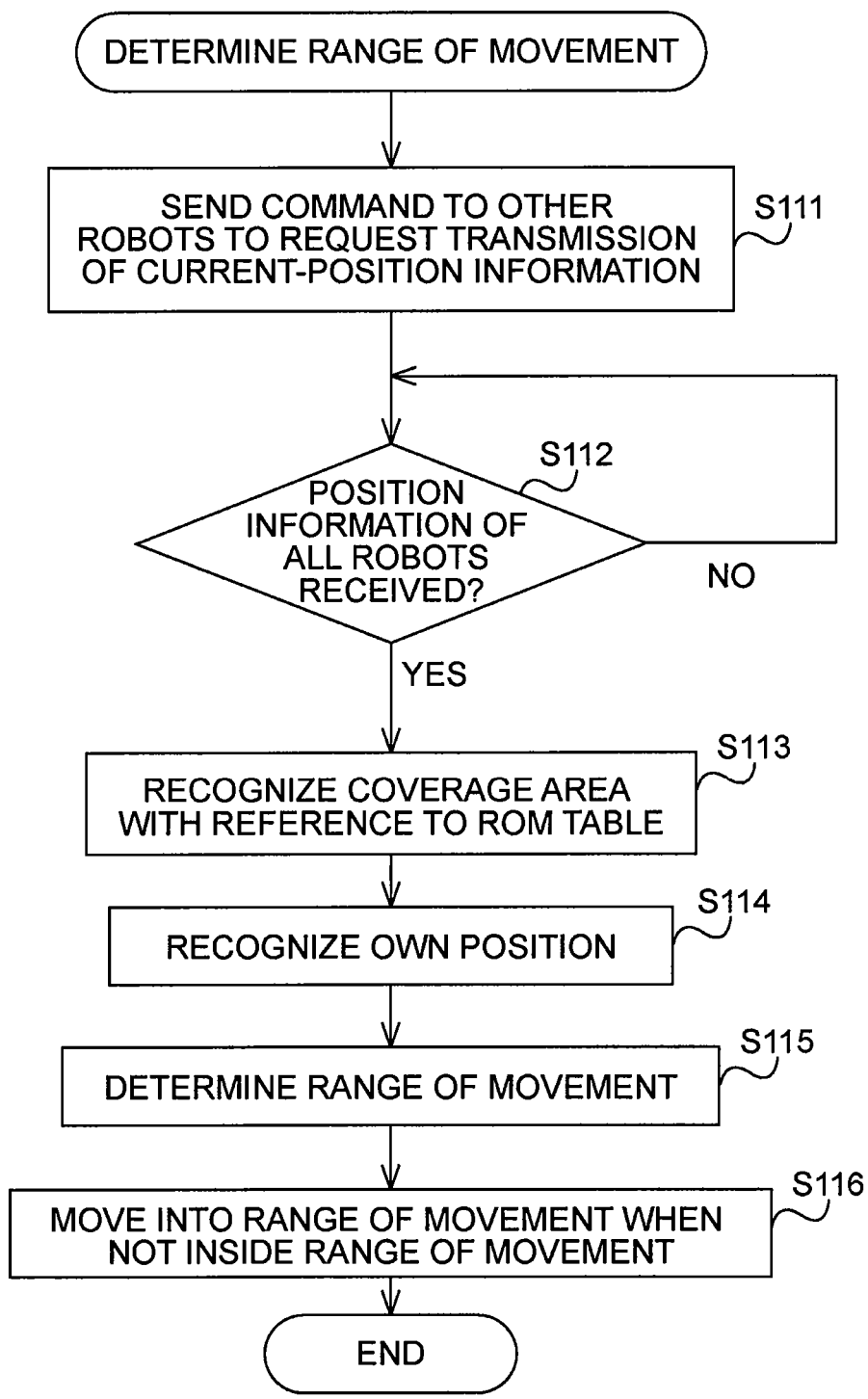
FIG. 20 is a flowchart of a process executed by the robot camera.

That is, the process according to the flowchart shown in FIG. 19 is executed by all the robot cameras in the robot system shown in FIG. 12. Thus, robot cameras other than the robot camera 100 execute step S102 so that robot IDs of the other robot cameras are transmitted, and the robot IDs transmitted from the other robot cameras are received in step S103.

More specifically, the robot IDs transmitted from the other robot cameras are received by the receiver 112 via the antenna 112A and supplied to the amount-of-control calculator 108. The amount-of-control calculator 108 receives the robot IDs supplied from the receiver 112 as described above.

After step S103, the process proceeds to step S104, in which the amount-of-control calculator 108 checks whether a predetermined time (e.g., 30 seconds) has elapsed since, for example, the robot ID was transmitted in immediately preceding step S102.

When it is determined in step S104 that the predetermined time has not elapsed, the process returns to step S103, in which the amount-of-control calculator 108 waits to further receive robot IDs transmitted from other robot cameras. Then, the loop formed by steps S103 and S104 is repeated.

When it is determined in step S104 that the predetermined time has elapsed, the process proceeds to step S105. In step S105, the amount-of-control calculator 108 detects (counts) the number of robot IDs of the other robot cameras, obtained through the loop of steps S103 and S104, and recognizes the number of the robot IDs plus the robot camera 100 itself as the number of robot cameras that are to be in charge of surveillance in the surveillance area (hereinafter referred to as robot cameras in charge of surveillance as appropriate). The process then proceeds to step S106.

In step S106, the amount-of-control calculator 108 recognizes coverage area on the basis of the number of robot cameras in charge of surveillance, recognized in step S105, the reference position of the surveillance area, and so forth, and determines a range of movement where the robot camera 100 moves for surveillance on the basis of the coverage areas and so forth. Then, when the current position of the robot camera 100 is not within the range of movement, the amount-of-control calculator 108 controls the movement controller 110 to drive (control) the movement mechanism 103, thereby moving the robot camera 100 into the range of movement.

The process then proceeds from step S106 to step S107, in which the amount-of-control calculator 108 determines whether to turn off power. When it is determined that power is not to be turned off, the process returns to step S101, and the same process is repeated.

On the other hand, when it is determined in step S107 that power is to be turned off, the amount-of-control calculator 108 turns off power. The process is then exited.

An administrator of the robot camera system shown in FIG. 12 has, for example, a robot controller (not shown) for controlling the robot camera 100. The robot controller is configured to send a command in accordance with a user's operation by wireless. The command transmitted from the robot controller is received by the receiver 112 via the antenna 112A and supplied to the amount-of-control calculator 108.

For example, when the command supplied to the amount-of-control calculator 108 is a command requesting power off, the amount-of-control calculator 108 determines in step S107 that power is to be turned off.

Furthermore, the robot camera 100 has a battery (not shown), and the blocks of the robot camera 100 operate by receiving power supplied from the battery. The amount-of-control calculator 108 also determines in step S107 that power is to be turned off when, for example, the remaining capacity of the battery has become small.

Next, the process executed in step S106 shown in FIG. 19 will be described in detail with reference to a flowchart shown in FIG. 20.

In step S111, the amount-of-control calculator 108 controls the transmitter 111 so that a command is transmitted via the transmitter 111 and the antenna 111A to robot cameras in charge of surveillance other than the robot camera 100 to request that their respective current positions be returned (hereinafter referred to as a position requesting command).

Then, the amount-of-control calculator 108 receives responses to the position requesting command, including the current positions, from the robot cameras in charge of surveillance other than the robot camera 100 via the antenna 112A and the receiver 112. The responses to the position requesting command, transmitted from the robot cameras in charge of surveillance, include robot IDs of the robot cameras in charge of surveillance as well as the current positions thereof.

After step S111, the process proceeds to step S112, in which the amount-of-control calculator 108 checks whether responses from all the robot cameras in charge of surveillance other than the robot camera 100 itself have been received.

When it is determined in step S112 that responses from all the robot cameras in charge of surveillance other than the robot camera 100 itself have not been received, the process returns to step S112, and the same process is repeated.

On the other hand, when it is determined in step S112 that responses from all the robot cameras in charge of surveillance other than the robot camera 100 itself have been received, i.e., when the amount-of-control calculator 108 has all received responses including the respective robot IDs of the other robot cameras, obtained through the loop of steps S103 and S104 shown in FIG. 19, the amount-of-control calculator 108 recognizes the current positions of all the robot cameras in charge of surveillance other than the robot camera 100 itself on the basis of the responses. The process then proceeds to step S113, in which the amount-of-control calculator 108 recognizes coverage areas by referring to the ROM table stored in the ROM-table storage unit 114.

More specifically, for example, when the number of robot cameras in charge of surveillance, recognized in step S105 shown in FIG. 19, is 4, the surveillance area is the circular surveillance area shown in FIG. 16A, and the ROM table shown in FIG. 16B is stored in the ROM-table storage unit 114 shown in FIG. 14, the amount-of-control calculator 108 obtains "range information" representing 90 degrees, associated with the "number of robots" of 4, by referring to the ROM table shown in FIG. 16B. Furthermore, as coverage areas, the amount-of-control calculator 108 recognizes areas corresponding to four sectors with central angles of 90 degrees on the basis of the "range information" representing 90 degrees, formed by equally dividing the circular surveillance area into four by straight lines passing through the center of the surveillance area, as shown in FIG. 16A.

Upon recognizing the coverage areas in step S113 as described above, in step S114, the amount-of-control calculator 108 recognizes the current position of the robot camera 100 itself on the basis of information supplied from the position-information detector 113.

More specifically, the position-information detector 113 receives signals from GPS satellites via the antenna 113A, obtains the current position of the robot camera 100 itself on the basis of the signals, and supplies information representing the current position to the amount-of-control calculator 108. In step S114, the amount-of-control calculator 108 recognizes the current position of the robot camera 100 itself on the basis of the information supplied from the position-information detector 113 as described above.

After step S114, the process proceeds to step S115. In step S115, the amount-of-control calculator 108 determines a range of movement where the robot camera 100 itself moves for surveillance, on the basis of information including the current positions recognized from the responses from all the robot cameras in charge of surveillance other than the robot camera 100, the coverage areas recognized in step S113, the current position of the robot camera 100 recognized in step S114, and information identifying the surveillance area such as the reference position.

More specifically, for example, when the current position of the robot camera 100 itself is within one of the coverage areas recognized in step S113, the amount-of-control calculator 108 determines the coverage areas as a candidate of the range of movement (hereinafter referred to as a candidate range as appropriate). Then, the amount-of-control calculator 108 determines the candidate range as the range of movement of the robot camera 100 when other robot cameras (robot cameras in charge of surveillance) do not exist in the candidate range.

When other robot cameras exist in the candidate range, the amount-of-control calculator 108 recognizes a coverage area that is closest from the candidate range among coverage areas where robot cameras in charge of surveillance do not exist (hereinafter referred to as a vacant coverage area as appropriate), and checks whether the robot camera 100 itself is closest to the vacant coverage area among the robot cameras in charge of surveillance existing in the candidate range. When the robot camera 100 itself is closest to the vacant coverage area among the robot cameras in charge of surveillance existing in the candidate range, the amount-of-control calculator 108 determines the vacant coverage area as the range of movement of the robot camera 100.

On the other hand, when the current position of the robot camera 100 itself is within none of the coverage areas recognized in step S113, for example, the amount-of-control calculator 108 determines a coverage area that is closest to the current position of the robot camera 100 and where other robot cameras in charge of surveillance do not exist as the range of movement of the robot camera 100.

All the robot cameras in charge of surveillance, including the robot camera 100, determine their own ranges of movement as described above so that, for example, each coverage area falls within the range of movement of at least one robot cameras in charge of surveillance.

After the range of movement is determined as described above, the process proceeds from step S115 to step S116. In step S116, when the current position of the robot camera 100 is not within the range of movement of the robot camera 100, the amount-of-control calculator 108 controls the movement controller 110 to drive the movement mechanism 103 so that the robot camera 100 is moved into the range of movement of the robot camera 100. The process is then exited.

After the range of movement of the robot camera 100 is determined, when the robot camera 100 exists within the range of movement, the robot camera 100 starts a tracking process of tracking a desired object within the range of movement.

Now, the tracking process will be described with reference to a flowchart shown in FIG. 21.

It is assumed herein that, for example, features of a wanted criminal are stored in the object storage unit 105 of the robot camera 100.

In the tracking process, the amount-of-control calculator 108 controls the platform and zoom controller 109 to drive the platform and zoom mechanism 102 so that the imager 101 is panned. Thus, the imager 101 captures images of the surrounding while being panned, and the resulting images are sequentially supplied to the image checker 107 via the image processor 106.

In step S121, the image checker 107 checks whether an object having the possibility of being a criminal, for example, a person, is included in the image captured by the imager 101. When it is determined that a person is not included in the image, the process returns to step S121, and the same process is repeated.

On the other hand, when it is determined in step S121 that a person, which is an object having the possibility of being a criminal, is included in the image captured by the imager 101, the process proceeds to step S122. In step S122, the image checker 107 extracts features of the person (object) included in the image captured by the imager 101, and checks whether the features coincide with the criminal's features stored in the object storage unit 105.

When it is determined in step S122 that the features of the object included in the image captured by the imager 101 do not coincide with the criminal's features stored in the object storage unit 105, the process returns to step S121, and the same process is repeated.

On the other hand, when it is determined in step S122 that the features of the object included in the image captured by the imager 101 coincide with the criminal's features stored in the object storage unit 105, the image checker 107 reports to the amount-of-control calculator 108 that the features of the object included in the image captured by the imager 101 coincide with the criminal's features stored in the object storage unit 105. The process then proceeds to step S123.

Upon receiving the report from the image checker 107 that the features of the object included in the image captured by the imager 101 coincide with the criminal's features stored in the object storage unit 105, in step S123, the amount-of-control calculator 108 causes the robot camera 100 to start tracking of the object having the features coinciding with the criminal's features stored in the object storage unit 105 (hereinafter referred to as a tracking target object) and transmission of images captured by the imager 101.

More specifically, the amount-of-control calculator 108 controls the movement controller 110 to drive the movement mechanism 103, thereby moving the robot camera 100 so that the robot camera 100 is located at a predetermined position relative to the tracking target object. Furthermore, the amount-of-control calculator 108 controls the platform and zoom controller 109 to drive the platform and zoom mechanism 102, thereby adjusting the zoom factor of the imager 101 or panning or tilting the imager 101 so that the entirety or a specific part (e.g., the face) of the tracking target object is clearly represented in images captured by the imager 101.

Furthermore, the amount-of-control calculator 108 obtains the images captured by the imager 101 from the image processor 106 via the image checker 107, and controls the transmitter 111 so that the images are transmitted to a terminal of the administrator of the robot system shown in FIG. 12.

After the tracking of the tracking target object and the transmission of images captured by the imager 101 are started in step S123 as described above, the process proceeds to step S124. In step S124, the amount-of-control calculator 108 checks whether the current position of the robot camera 100 is outside the range of movement of the robot camera 100.

When it is determined in step S124 that the current position of the robot camera 100 is not outside the range of movement of the robot camera 100, i.e., when the current position of the robot camera 100 is within the range of movement of the robot camera 100, the process returns to step S124, and the same process is repeated.

That is, in this case, the tracking of the tracking target object (movement of the robot camera 100) and the transmission of images captured by the imager 101 are continued.

On the other hand, when it is determined in step S124 that the current position of the robot camera 100 is outside the range of movement of the robot camera 100, i.e., when the tracking target object has moved into the range of movement of another robot camera in charge of surveillance or moved out of the surveillance area, the process proceeds to step S125. In step S125, the amount-of-control calculator 108 stops the tracking of the tracking target object and the transmission of images captured by the imager 101, started in step S123. The process then returns to step S121.

When the tracking target object has moved into the range of movement of another robot camera in charge of surveillance, the another robot camera in charge of surveillance tracks the tracking target object within the range of movement.

When the tracking target object has moved into the range of movement of another robot camera in charge of surveillance so that the robot camera 100 has quit tracking of the tracking target object, it is possible to send the current position of the robot camera 100 at that time to the another robot camera in charge of surveillance. In this case, the another robot camera in charge of surveillance can find (detect) the tracking target object quickly by moving to the proximity of the current position of the robot camera 100.

As described above, the robot camera 100 determines a range of movement of the robot camera 100 within which the imager 101 can be moved, detects a tracking target object within the range of the robot camera 100, moves the imager 101 by the movement mechanism 103 so that the imager 101 is located at a desired position relative to the tracking target object and captures images of the tracking target object, and sends (outputs) the resulting images including the tracking target object to an administrator. When the imager 101 is moved out of the range of movement of the robot camera 100, the transmission (output) of images and movement of the imager 101 by the movement mechanism 103 are stopped. Thus, the robot cameras of the robot system shown in FIG. 12 can track the tracking target object through mutual cooperation.

Figure 21:
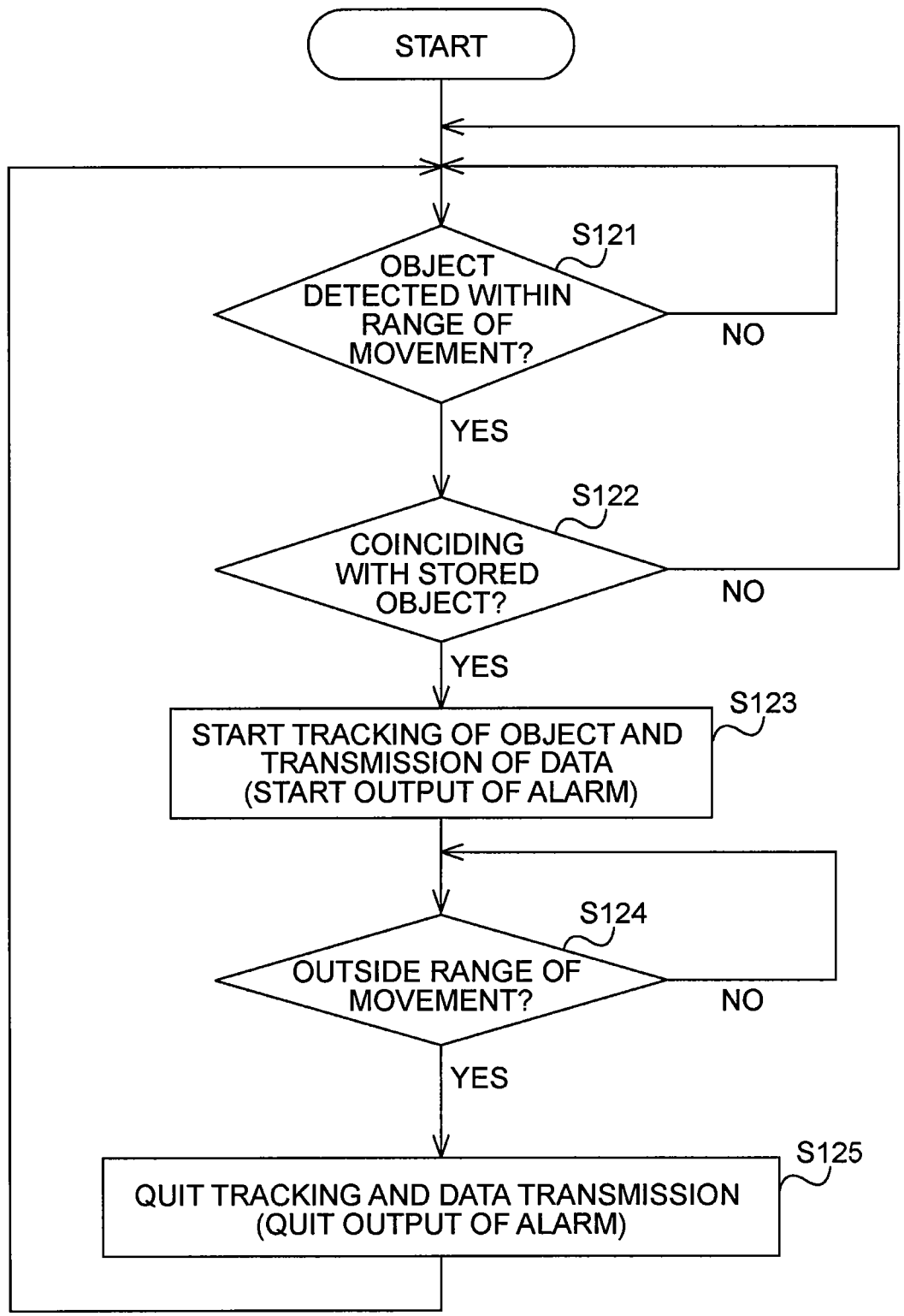
FIG. 21 is a flowchart of a process executed by the robot camera.

In the tracking process shown in FIG. 21, in step S123, in addition to starting the tracking of the tracking target object and the transmission of images captured by the imager 101, it is possible to start output of an alarm (threatening sound) from the speaker 115 under the control of the amount-of-control calculator 108. In this case, in step S125, the output of the alarm from the speaker 115 is stopped as well as the tracking of the tracking target object and the transmission of images captured by the imager 101.

The arrangement may be such that only a robot camera in charge of surveillance and having a range of movement including a predetermined position outputs an alarm from the speaker 115. For example, the arrangement may be such that only a robot camera in charge of surveillance and having a range of movement including the position of a house of a specific user outputs an alarm from the speaker 115. In this case, an alarm is output when, for example, a criminal as a tracking target object is in the proximity of the house of the specific user. Thus, it is possible to keep the criminal away from the house of the specific user.

Furthermore, a speaker that can output an alarm may be provided at the house of the specific user. In this case, when a tracking target object is detected by a robot camera in charge of surveillance and having a range of movement including the position of the house of the specific user or a robot camera in charge of surveillance and having a range of movement close to the position of the house of the specific user, the robot camera in charge of surveillance sends a command to the speaker provided at the house of the specific user so that an alarm is output from the speaker. Also in this case, it is possible to keep the criminal as the tracking target object away from the house of the specific user.

In defining the surveillance area, the reference position (FIGS. 16A to 18A) and radius or the like are used. These pieces of information can be given to the individual robot cameras of the robot system shown in FIG. 12, for example, by wireless communications from the robot controller owned by the administrator of the robot system shown in FIG. 12.

Furthermore, a camera may be provided at the house of the specific user. In this case, when a tracking target object is detected by a robot camera in charge of surveillance and having a range of movement including the position of the house of the specific user or a robot camera in charge of surveillance and having a range of movement close to the position of the house of the specific user, the robot camera in charge of surveillance sends a command to the camera provided at the house of the specific user so that the camera starts capturing images of the surrounding.

Although the surveillance area is divided into coverage areas without overlaps in the examples shown in FIGS. 16A to 18A, coverage areas may overall each other partially or entirely.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A mobile object apparatus comprising:
an object having a function;
a moving unit connected to the object, said moving unit being configured to move so as to move the object;
a driving unit configured to drive the moving unit;
a receiver configured to receive an external command, the driving unit being configured to control the moving unit according to the received external command; and
a second receiver configured to receive an external video signal or an external audio signal, the driving unit being configured to:
  (a) control the moving unit based on information extracted from the received video signal or audio signal, said external video signal and said external audio signal being transmitted separate from a remote commander;
  (b) determine whether an external pressure is being applied to the mobile object apparatus, said external pressure being applied in a first direction that is perpendicular to a direction of gravity; and
  (c) in response to an external pressure being applied to the mobile object apparatus, apply a counterforce in a second direction that is perpendicular to the direction of gravity, said second direction being opposite from said first direction.

2. The mobile object apparatus according to claim 1, wherein the object is a television receiver.

3. The mobile object apparatus according to claim 1, wherein the object is a piece of furniture.

4. The mobile object apparatus according to claim 1, wherein the external command is a command sent by a user from a remote commander.

5. The mobile object apparatus according to claim 1, wherein the function is a function of presenting a video signal.

6. The mobile object apparatus according to claim 1, wherein the function is a storage function.

7. The mobile object apparatus according to claim 1, wherein the applied counterforce provides an anti-crime function.

8. A mobile object system comprising:
a plurality of mobile object apparatuses, each of the plurality of mobile object apparatuses including:
  (a) an object having a function;
  (b) a moving unit connected to the object, said moving unit being configured to move so as to move the object;
  (c) a driving unit configured to drive the moving unit;
  (d) a receiver configured to receive an external command, the driving unit being configured to control the moving unit according to the received external command; and
  (e) a second receiver configured to receive an external video signal or an external audio signal, the driving unit being configured to:
    (i) control the moving unit based on information extracted from the received video signal or audio signal, said external video signal and said external audio signal being transmitted separate from a remote commander;
    (ii) determine whether an external pressure is being applied to the mobile object apparatus, said external pressure being applied in a first direction that is perpendicular to a direction of gravity; and
    (iii) in response to an external pressure being applied to the mobile object apparatus, apply a counterforce in a second direction that is perpendicular to the direction of gravity, said second direction being opposite from said first direction.

9. The mobile object system according to claim 8, wherein the object is a television receiver.

10. The mobile object system according to claim 8, wherein the object is a piece of furniture.

11. The mobile object system according to claim 8, wherein the external command includes a command sent by a user from a remote commander.

12. The mobile object system according to claim 8, wherein the function includes presenting a video signal.

13. The mobile object system according to claim 8, wherein the function includes a storage function.

14. The mobile object system according to claim 8, wherein the applied counterforce provides an anti-crime function.

15. A mobile object apparatus comprising:
an object having a first function;
a moving unit connected to the object, said moving unit configured to move so as to move the object;
a driving unit configured to drive the moving unit;
a first receiver;
a second receiver;
a processor; and
a memory device which stores instructions, which when executed by the processor, cause the processor to operate with the object, the moving unit, the driving unit, the first receiver and the second receiver to:
- (a) cause the first receiver to receive an external command;
- (b) cause the driving unit to control the moving unit in accordance with said received external command;
- (c) cause the second receiver to receive at least one of an external video signal and an external audio signal;
- (d) in response to said second receiver receiving said external video signal:
  - (i) execute image recognition to extract a first specific information; and
  - (ii) cause the driving unit to control the moving unit in accordance with said extracted first specific information;
- (e) in response to said second receiver receiving said external audio signal:
  - (i) execute speech recognition to extract a second specific information; and
  - (ii) cause the driving unit to control the moving unit in accordance with said extracted second specific information;
- (f) determine whether an external pressure is being applied to the mobile object apparatus, said external pressure being applied in a first direction that is perpendicular to a direction of gravity; and
- (g) in response to an external pressure being applied to the mobile object apparatus, apply a counterforce in a second direction that is perpendicular to the direction of gravity, said second direction being opposite from said first direction.

* * * * *